US010890660B2

(12) United States Patent
Wigh et al.

(10) Patent No.: US 10,890,660 B2
(45) Date of Patent: Jan. 12, 2021

(54) FREQUENCY STEERED SONAR ARRAY ORIENTATION

(71) Applicant: Garmin Switzerland GmbH, Schaffhausen (CH)

(72) Inventors: Jeffrey B. Wigh, Olathe, KS (US); Brian T. Maguire, Bixby, OK (US); Thomas G. Behrendt, Paola, KS (US); David F. Lammers-Meis, Overland Park, KS (US); Samuel T. Pirtle, Shawnee, KS (US)

(73) Assignee: Garmin Switzerland GmbH

( * ) Notice: Subject to any disclaimer, the term of this patent is extended or adjusted under 35 U.S.C. 154(b) by 509 days.

(21) Appl. No.: 15/782,484

(22) Filed: Oct. 12, 2017

(65) Prior Publication Data
US 2018/0100922 A1    Apr. 12, 2018

Related U.S. Application Data

(60) Provisional application No. 62/407,335, filed on Oct. 12, 2016.

(51) Int. Cl.
*H04B 1/02* (2006.01)
*G01S 15/89* (2006.01)
(Continued)

(52) U.S. Cl.
CPC .............. *G01S 15/89* (2013.01); *G01S 7/521* (2013.01); *G01S 7/6272* (2013.01);
(Continued)

(58) Field of Classification Search
None
See application file for complete search history.

(56) References Cited

U.S. PATENT DOCUMENTS 3,540,544 A * 11/1970 Karlson ................. H04R 1/345
                                                                181/154
4,069,468 A *  1/1978 Bartram ................. G01S 15/60
                                                                 367/91
(Continued)

FOREIGN PATENT DOCUMENTS

JP          01086083 A  *  3/1989

OTHER PUBLICATIONS

Printout from http://www.ncbi.nlm.nih.gov/pmc/articles/PMC4703966/; published prior to Sep. 29, 2016.
(Continued)

*Primary Examiner* — Hovhannes Baghdasaryan
*Assistant Examiner* — Jonathan D Armstrong
(74) *Attorney, Agent, or Firm* — Samuel M. Korte; Max M. Ali

(57) ABSTRACT

A transducer assembly comprises a housing and a plurality of frequency steered transducer array elements. Each of the transducer array elements includes a plurality of piezoelectric elements. The frequency steered transducer array elements are configured to receive a transmit electronic signal including a plurality of frequency components and to transmit an array of sonar beams into a body of water. Each sonar beam is transmitted in an angular direction that varies according to one of the frequency components of the transmit electronic signal. The frequency steered transducer array elements are positioned within the housing in a fan-shaped configuration where an end section of at least two of the frequency steered transducer array elements are within an intersection range of each other.

11 Claims, 16 Drawing Sheets

(51) Int. Cl.

| | |
|---|---|
| *G10K 11/32* | (2006.01) |
| *H04R 1/40* | (2006.01) |
| *G10K 11/20* | (2006.01) |
| *G01S 7/62* | (2006.01) |
| *G01S 15/87* | (2006.01) |
| *G01S 7/521* | (2006.01) |
| *G10K 11/00* | (2006.01) |
| G10K 11/34 | (2006.01) |
| H04R 17/00 | (2006.01) |

(52) U.S. Cl.
CPC ............ *G01S 7/6281* (2013.01); *G01S 15/87* (2013.01); *G10K 11/008* (2013.01); *G10K 11/205* (2013.01); *G10K 11/32* (2013.01); *H04R 1/40* (2013.01); *H04R 1/403* (2013.01); G10K 11/343 (2013.01); H04R 17/00 (2013.01); H04R 2217/00 (2013.01); H04R 2499/13 (2013.01)

(56) References Cited

U.S. PATENT DOCUMENTS

| | | | | |
|---|---|---|---|---|
| 4,121,190 A | * | 10/1978 | Edgerton | G01S 15/42 367/106 |
| 4,199,746 A | * | 4/1980 | Jones | G01S 15/8902 367/135 |
| 4,389,110 A | * | 6/1983 | Pizzuti | G03B 17/04 396/178 |
| 4,398,421 A | * | 8/1983 | White | G01B 17/02 73/597 |
| 4,435,984 A | * | 3/1984 | Gruber | G01N 29/07 73/1.82 |
| 4,479,206 A | * | 10/1984 | Granberg | G01S 15/42 367/104 |
| 4,635,484 A | * | 1/1987 | Lerch | G10K 11/32 310/336 |
| 4,982,924 A | * | 1/1991 | Havins | G01S 7/521 248/288.31 |
| 5,033,029 A | * | 7/1991 | Jones | G01S 15/8902 367/104 |
| 5,091,892 A | * | 2/1992 | Secretan | G10K 11/008 310/337 |
| 5,311,781 A | * | 5/1994 | Gates | G01F 1/002 73/861.18 |
| 5,369,623 A | * | 11/1994 | Zerangue | G08B 21/082 340/540 |
| 5,805,528 A | * | 9/1998 | Hamada | G01S 7/6227 367/111 |
| 5,923,617 A | | 7/1999 | Zehner | |
| 7,542,376 B1 | | 6/2009 | Thompson | |
| 7,606,114 B2 | | 10/2009 | Bachelor | |
| 7,633,835 B1 | * | 12/2009 | Erikson | G10K 9/121 367/142 |
| 7,889,600 B2 | | 2/2011 | Thompson | |
| 8,811,120 B2 | | 8/2014 | Bachelor | |
| RE45,379 E | | 2/2015 | Rowe | |
| 8,964,507 B2 | | 2/2015 | Bachelor | |
| 9,459,350 B2 | * | 10/2016 | Betts | G01S 15/42 |
| 2005/0154503 A1 | * | 7/2005 | Jacobs | G05D 1/024 701/1 |
| 2008/0007142 A1 | * | 1/2008 | Toda | G10K 11/28 310/335 |
| 2010/0054084 A1 | * | 3/2010 | Boucher | G01S 7/521 367/118 |
| 2010/0106431 A1 | * | 4/2010 | Baba | G01N 29/07 702/39 |
| 2010/0256813 A1 | * | 10/2010 | Chiappetta | B62D 61/10 700/258 |
| 2011/0013484 A1 | * | 1/2011 | Coleman | G01S 15/87 367/88 |
| 2011/0013485 A1 | * | 1/2011 | Maguire | G01S 15/96 367/88 |
| 2012/0014220 A1 | * | 1/2012 | DePasqua | G01S 7/52004 367/88 |
| 2013/0075193 A1 | * | 3/2013 | Vavalle | B29C 70/088 181/284 |
| 2013/0148471 A1 | * | 6/2013 | Brown | G01S 15/8902 367/88 |
| 2013/0208568 A1 | * | 8/2013 | Coleman | G01S 7/521 367/88 |
| 2014/0092709 A1 | * | 4/2014 | Miller | G01S 7/52003 367/87 |
| 2014/0269164 A1 | * | 9/2014 | Betts | G01S 15/42 367/7 |
| 2014/0269192 A1 | * | 9/2014 | Proctor | G01S 15/8902 367/88 |
| 2015/0168572 A1 | * | 6/2015 | Bagaini | G01V 1/24 367/14 |
| 2016/0018514 A1 | | 1/2016 | Black et al. | |
| 2016/0018516 A1 | | 1/2016 | Brown et al. | |
| 2016/0047906 A1 | | 2/2016 | Matson et al. | |
| 2016/0049143 A1 | | 2/2016 | Matson et al. | |
| 2016/0131759 A1 | * | 5/2016 | Kozuki | G01S 7/52003 367/102 |
| 2016/0341827 A1 | * | 11/2016 | Horner | G01S 7/6245 |
| 2017/0090021 A1 | * | 3/2017 | Sayer | G01S 7/521 |
| 2017/0146642 A1 | * | 5/2017 | Stokes | G01S 15/89 |
| 2017/0164839 A1 | * | 6/2017 | Kandori | A61B 8/14 |
| 2017/0212230 A1 | * | 7/2017 | Wigh | G01S 7/629 |
| 2018/0100922 A1 | * | 4/2018 | Wigh | G01S 7/521 |
| 2018/0217244 A1 | | 8/2018 | Coleman et al. | |
| 2020/0072953 A1 | * | 3/2020 | Wigh | G01S 15/89 |
| 2020/0256967 A1 | * | 8/2020 | Wigh | G01S 15/96 |

OTHER PUBLICATIONS

Printout from http://www.bbcboards.net/showthread.php?t=700823 published prior to Sep. 29, 2016.

Garmin Panoptix™ PS30; https://buy.garmin.com/en-US/US/p/149188 published prior to Sep. 29, 2016.

\* cited by examiner

FREQUENCY STEERED SONAR ARRAY ORIENTATION

CROSS-REFERENCE TO RELATED APPLICATIONS

The present application claims the benefit under 35 U.S.C. § 119(e) of U.S. Provisional Application Ser. No. 62/407,335, entitled FREQUENCY STEERED SONAR ARRAY ORIENTATION, filed on Oct. 12, 2016. U.S. Provisional Application Ser. No. 62/407,335 is herein incorporated by reference in its entirety.

BACKGROUND

Traditional recreational scanning sonar systems are often incapable of generating real-time sonar imagery. For example, sidescan sonar systems generate useful imagery only when attached to a moving boat. This can be problematic for fishermen, whose vessels may remain stationary for extended periods of time while fishing. And, although some sonar systems are capable of generating real-time sonar imagery, these systems are incapable of generating the historical sequence of images to which many fisherman are accustomed. Existing frequency steered sonar systems are often sized and configured in an undesirable manner for boat (transom) or tolling motor mounting.

Frequency steered sonar arrays have been utilized to provide high quality imaging at near video framerates in the underwater exploration and surveying industries. The advantage of frequency steered sonar arrays over alternative techniques such as phased arrays is the minimal hardware cost required to drive and sample frequency steered arrays. The tradeoff is that multiple frequency steered arrays must be used in coordination to achieve continuous wide field of views.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present technology will be apparent from the following detailed description of the embodiments and the accompanying drawing figures.

Embodiments of the present technology provide a transducer assembly comprising a housing and a plurality of frequency steered transducer array elements. Each of the transducer array elements includes a plurality of piezoelectric elements. The frequency steered transducer array elements are configured to receive a transmit electronic signal including a plurality of frequency components and to transmit an array of sonar beams into a body of water. Each sonar beam is transmitted in an angular direction that varies according to one of the frequency components of the transmit electronic signal. The frequency steered transducer array elements are positioned within the housing in a fan-shaped configuration where an end section of at least two of the frequency steered transducer array elements are within an intersection range of each other.

BRIEF DESCRIPTION OF THE DRAWINGS

The detailed description is described with reference to the accompanying figures. The use of the same reference numbers in different instances in the description and the figures may indicate similar or identical items.

Figure 1:
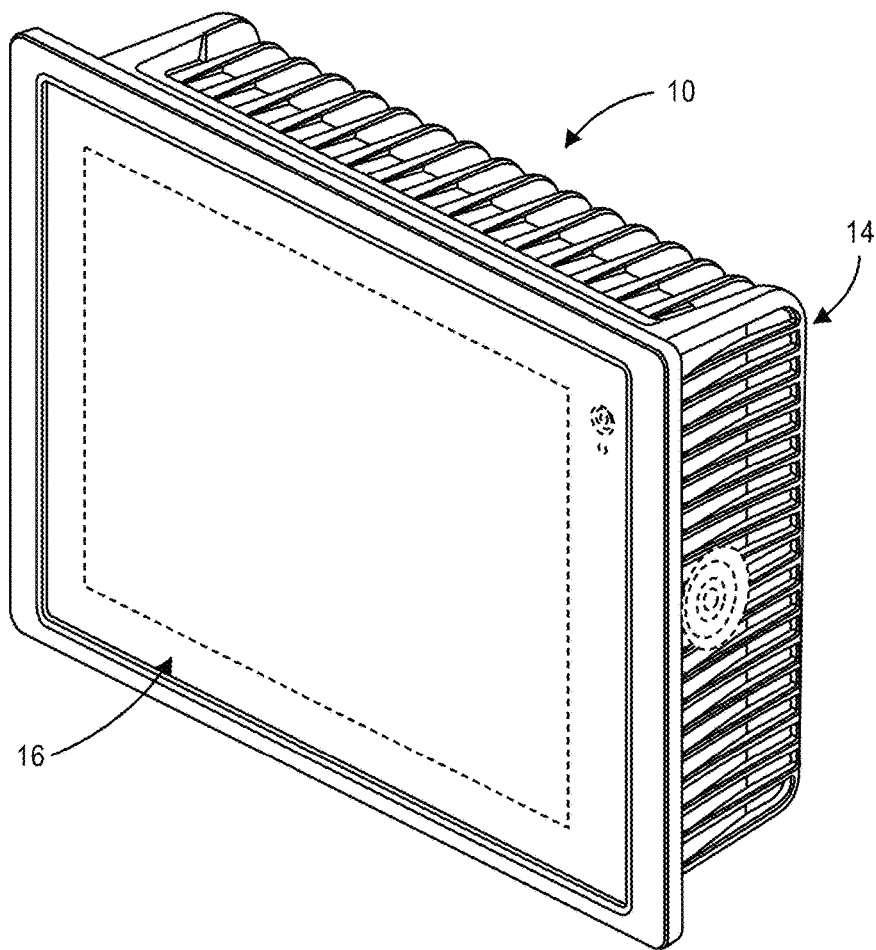
FIG. 1 is a front perspective view of a marine sonar display device constructed in accordance with various embodiments of the present technology.

The drawing figures do not limit the present technology to the specific embodiments disclosed and described herein. The drawings are not necessarily to scale, emphasis instead being placed upon clearly illustrating the principles of the technology.

DETAILED DESCRIPTION

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the present technology. The following detailed description is, therefore, not to be taken in a limiting sense. The scope of the present technology is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Conventional frequency-steered array systems, such as those disclosed in U.S. Pat. No. 8,811,120, which is incorporated herein by specific reference, require a stacked array configuration, where each of the system transducers arrays are stacked in an "X-configuration." Such configurations may be unsuitable for mounting to the underside of a boat, given its very wide and multi-faceted drag cross section. For example, laminar flow of water across the transducer is jeopardized by the multiple angular facets in close proximity. The arrangement is not symmetric with respects to left-right turns performed by the boat which can result in unpredictable handling and response. Any cavitation, bubbling, etc will interrupt the sound and thus impair sound imaging.

Figure 11:
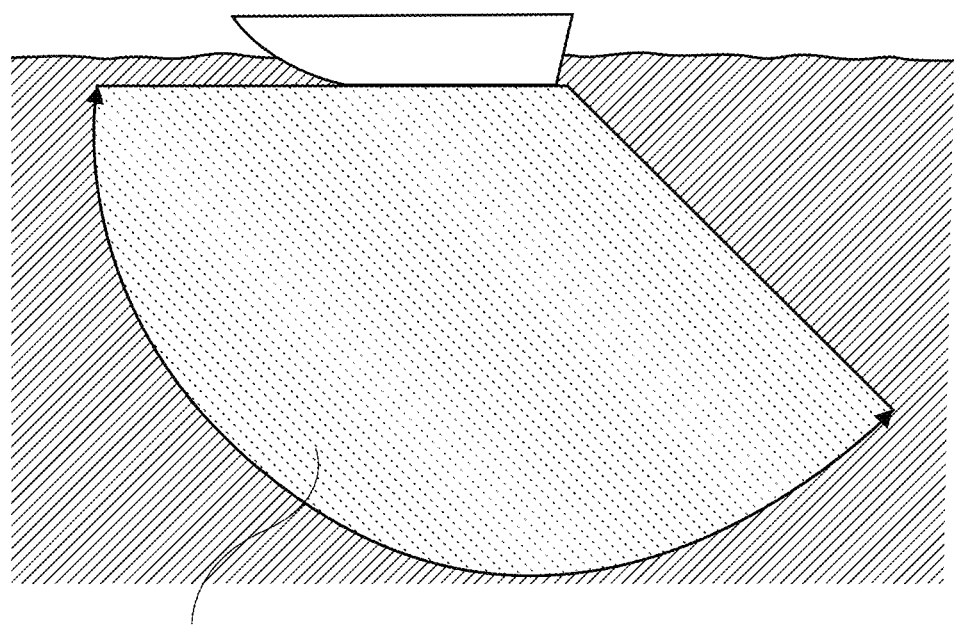
FIG. 11 is a diagram illustrating a field-of-view for an example sonar transducer assembly configured in accord with various embodiments of the present invention.

Embodiments of the present invention provide an improved frequency-steered array configuration, where the transducer arrays are more desirably positioned to provide a field-of-view like that illustrated in FIG. 11. In configuration, the transducer assembly provided by embodiments of the present invention can be oriented on the bow-stern plane of a vessel, such as a boat. This allows the transducer assembly to stay in the water and to continue sonifying and imaging the scene even when the boat is in motion and "on plane". Example transducer configurations described herein are suitable for boating use cases and provide an assembly that is narrow in drag cross-section, symmetric left-to-right, and with improved laminar flow.

Embodiments of the present technology may be utilized in combination with one or more of the following exemplary systems, features, and/or configurations of a marine sonar display device which interfaces with a frequency steered sonar element. The frequency steered sonar element may receive a transmit electronic signal from the marine sonar display device, with the transmit electronic signal including a plurality of frequency components. The frequency steered sonar element may transmit a corresponding array of sonar beams into a body of water, wherein the array of sonar beams forms a sonar wedge. Each sonar beam may have a frequency component determined by one of the frequency components of the transmit electronic signal. Furthermore, each sonar beam may be transmitted in an angular direction that varies according to the frequency component of the sonar beam. When the frequency steered sonar element receives the reflections of the sonar beams, it may generate a receive electronic signal. The receive electronic signal includes a plurality of frequency components, wherein each frequency component indicates the angular direction from which the reflections of the sonar beams were received.

The marine sonar display device may receive the receive electronic signal from the frequency steered sonar element. The marine sonar display device may then calculate an array of sonar data slices and generate an array of sonar image slices, wherein each sonar image slice includes sonar imagery from the reflections of one of the sonar beams. The marine sonar display device may display the array of sonar image slices in near real time. The array of sonar image slices includes a representation of underwater objects and the water bed that were in the path of the sonar wedge. The marine sonar display device may simultaneously display a historical sequence of at least one of the sonar image slices from the array. The historical sequence may be scrolled on the display.

Figure 2:
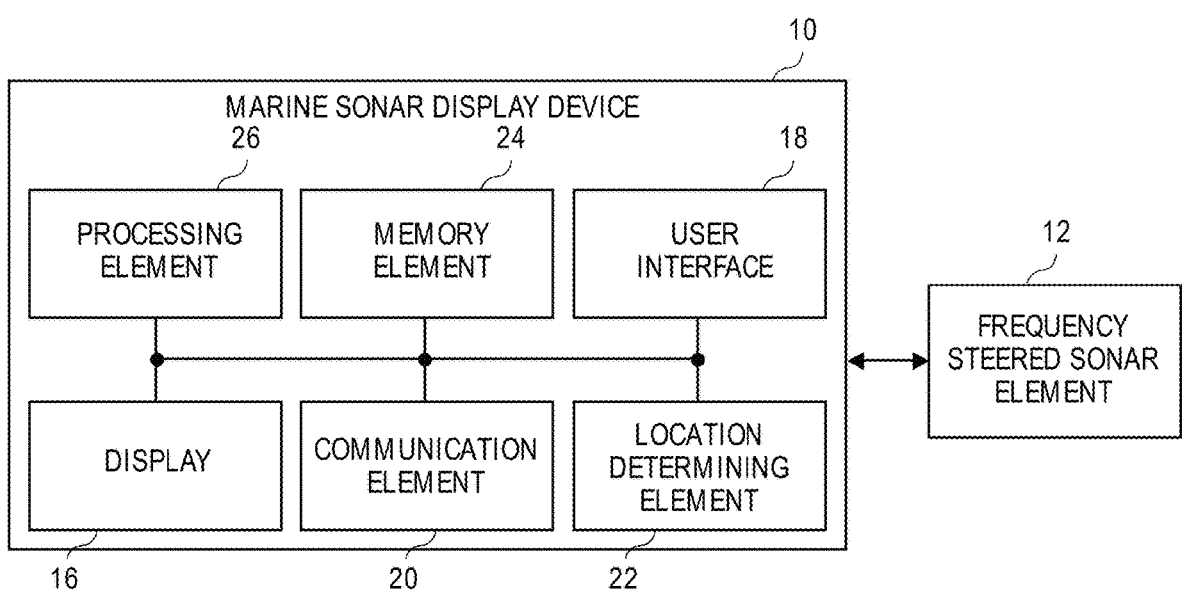
FIG. 2 is a schematic block diagram of at least a portion of the components of the marine sonar display device also illustrating that the marine sonar display device interfaces with a frequency steered sonar element.

Embodiments of the technology will now be described in more detail with reference to the drawing figures. Referring initially to FIGS. 1 and 2, a marine sonar display device 10 is illustrated which is configured to display images of underwater objects and the water bed derived from reflections of sonar beams generated by a frequency steered sonar element 12. The marine sonar display device 10 broadly comprises a housing 14, a display 16, a user interface 18, a communication element 20, a location determining element 22, a memory element 24, and a processing element 26.

Figure 3:
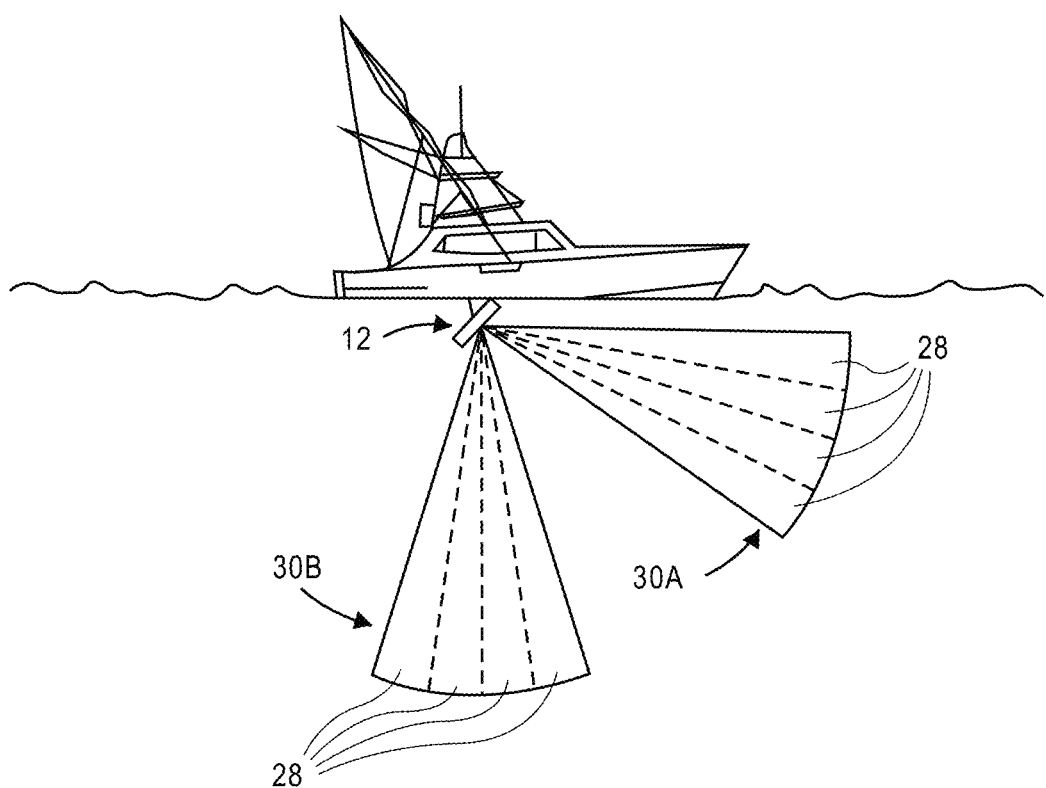
FIG. 3 is a side view of a marine vessel utilizing the marine sonar display device and the frequency steered sonar element, with the sonar element configured to transmit a first sonar wedge into the water in a forward direction and a second sonar wedge in a downward direction.
Figure 4:
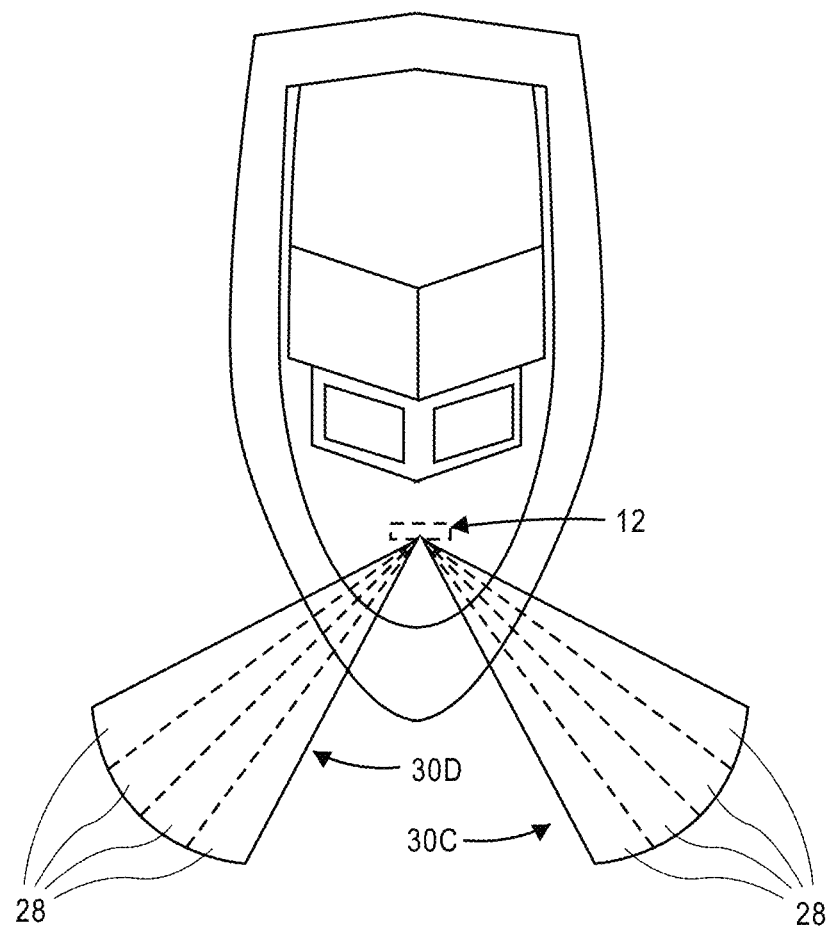
FIG. 4 is a front view of the marine vessel utilizing the marine sonar display device and the frequency steered sonar element, with the sonar element configured to transmit a first sonar wedge into the water in a port direction and a second sonar wedge in a starboard direction.

The frequency steered sonar element 12, as illustrated in FIGS. 3 and 4, may include one or more transducer elements or an array of transducer elements. Exemplary transducer elements may be formed from piezoelectric materials, like ceramics such as lead zirconate titanate (PZT) or polymers such as polyvinylidene difluoride (PVDF), which may change its dimension along one or more axes in response to an electronic signal applied to the material. In a typical implementation, an oscillating voltage may be applied to the piezoelectric material resulting in the material generating a mechanical oscillation at the same frequency as the oscillation of the voltage. In addition, the piezoelectric material may generate an oscillating electric voltage in response to oscillating acoustic waves applying pressure to the material which changes the dimension along one or more axes. In some implementations, the frequency steered sonar element 12 may include one or more individual transducer elements, wherein the faces of each transducer element are not necessarily aligned with the faces of other transducer elements. In other implementations, the frequency steered sonar element 12 may include one or more transducer arrays, wherein each transducer array includes a plurality of linearly-aligned transducer elements. The transducer arrays may be oriented in line with one another, parallel to one another, transverse to one another, or at any non-zero angle.

The frequency steered sonar element 12 may transmit a sonar beam 28 into a body of water in response to receiving a transmit electronic signal. The transmit electronic signal may include one or more single-ended electronic signals or one or more differential electronic signals. The type of electronic signal received by the frequency steered sonar element 12 may depend upon its components and architecture. For example, one or more single-ended electronic signals may be communicated to one or more individual transducer elements, while each half of one or more differential signals may be communicated to one transducer element in an array of transducer elements or to one transducer element in each array of transducer elements. Certain characteristics of the sonar beam 28, such as a frequency or frequency component, may correspond to similar characteristics of the transmit electronic signal, such that the sonar beam 28 is generated to include the same frequency component as a frequency component of the transmit electronic signal. The frequency steered sonar element 12 may transmit the sonar beam 28 in an angular direction with respect to the sonar element 12 which varies according to the frequency component of the sonar beam 28. For example, a first sonar beam 28 with a first frequency component may be transmitted in a first angular direction, while a second sonar beam 28 with a second frequency component may be transmitted in a second angular direction, and so forth.

During operation, the frequency steered sonar element 12 may receive a transmit electronic signal (from a device, such as the marine sonar display device 10 of the present technology) and in turn, may transmit an array of sonar beams 28. In some implementations, the transmit electronic signal may include a sequence of spaced-apart-in-time pulses, wherein each pulse is an oscillating electrical voltage or electrical current that includes one of a plurality of frequency components. For example, the transmit electronic signal may include a sequence of four pulses, each including a different frequency component. In other implementations, the transmit electronic signal may include at least one broadband pulse that includes a plurality of frequency components. As an example, the broadband pulse may include four frequency components.

Typically, the frequency components of the transmit electronic signal and, in turn, the sonar beams 28 are chosen such that the generated sonar beams 28 are adjacent to one another and the spacing between the angular directions of the sonar beams 28 ranges from less than 1 degree to approximately 5 degrees. For example, the frequencies may be chosen such that the frequency steered sonar element 12 transmits a first sonar beam 28 with a first frequency component in an angular direction of 0 degrees, a second sonar beam 28 with a second frequency component in an angular direction of 4 degrees, a third sonar beam 28 with a third frequency component in an angular direction of 8 degrees, and so forth. In other instances, the sonar beams 28 may overlap one another with little spacing between center lines of the main lobes of each beam. Furthermore, it is noted that the listed angular directions are relative and do not represent the absolute angular directions at which the sonar beams 28 would be transmitted into the water. The relationship between the frequency of the sonar beam 28 and the angular direction at which the sonar beam 28 is transmitted may vary according to the construction of the frequency steered sonar element 12, the components used, the dimensions of the components, the properties of the materials used for the components, and the like. An example of a transducer array that may embody, or be included in, the frequency steered sonar element 12 is disclosed in U.S. Pat. No. RE45379, which is hereby incorporated by reference into the current document.

The process of the frequency steered sonar element 12 receiving the transmit electronic signal and transmitting a corresponding array of sonar beams 28 may be known as a "sweep", a "frequency sweep", a "sonar beam sweep", etc. When a sweep occurs and an array of sonar beams 28 are transmitted in adjacent angular directions, a sonar wedge 30 may be formed which includes the volume in the water covered by the adjacent sonar beams 28. FIGS. 3 and 4 show examples of the frequency steered sonar element 12 in operation. FIG. 3 illustrates the frequency steered sonar element 12 transmitting a first sonar wedge 30A in the forward direction and a second sonar wedge 30B in the downward direction, each sonar wedge 30 being formed by an exemplary array of four sonar beams 28, each transmitted with a different frequency component. The dashed lines in FIGS. 3 and 4 indicate the virtual boundaries of each sonar beam 28. FIG. 4 illustrates the frequency steered sonar element 12 transmitting a first sonar wedge 30C in the left or port direction and a second sonar wedge 30D in the right or starboard direction. Likewise as in FIG. 3, each sonar wedge 30 in FIG. 4 is formed by one array of four sonar beams 28.

The implementations of the frequency steered sonar element 12 of FIGS. 3 and 4, wherein the sonar element 12 transmits two spaced apart sonar wedges 30, each formed by four sonar beams 28, are merely exemplary. The frequency steered sonar element 12 may be capable of transmitting greater or fewer numbers of sonar wedges 30, each formed by greater or fewer numbers of sonar beams 28. In addition, the spacing between each sonar wedge 30 may vary. Furthermore, the angular size of each sonar wedge 30 may vary. Each sonar wedge 30 of FIGS. 3 and 4 may have an angular size from approximately 40 to 45 degrees. The frequency steered sonar element 12 may be capable of transmitting a single sonar wedge 30 with an angular size of up to 180 degrees.

The frequency steered sonar element 12 may also receive reflections of the sonar beam 28 bouncing off objects in the water and the water bed. In response, the frequency steered sonar element 12 may generate a receive electronic signal. The receive electronic signal may include one or more single-ended electronic signals or one or more differential electronic signals. The type of electronic signal generated by the frequency steered sonar element 12 may depend upon its components and architecture. For example, frequency steered sonar elements 12 with one or more individual transducer elements may generate one or more single-ended electronic signals, while frequency steered sonar elements 12 with one or more arrays of transducer elements may generate one or more differential signals. Likewise with the transmit electronic signal and the sonar beam 28, certain characteristics of the receive electronic signal, such as a frequency or frequency component or frequency component data, correspond to similar characteristics of the reflections of the sonar beam 28, such that the frequency component of the receive electronic signal is the same frequency component as the reflections of the sonar beam 28. Furthermore, the frequency component of the receive electronic signal is an indication of the angular direction from which the reflections of the sonar beam 28 were received. For example, the receive electronic signal may include a first frequency component which indicates that the reflections of the sonar beam 28 were received from a first angular direction. The receive electronic signal may include a second frequency component which indicates that the reflections of the sonar beam 28 were received from a second angular direction, and so forth. The receive electronic signal may include multiple occurrences of the same frequency component (first, second, third, etc.) separated in time as the result of reflections of the same sonar beam 28 bouncing off of multiple objects in the water located at different distances from the frequency steered sonar element 12. If the frequency steered sonar element 12 transmitted a sonar wedge 30, then the receive electronic signal may include the same number of frequency components as were included in the transmit electronic signal which formed the sonar wedge 30.

If the frequency steered sonar element 12 transmits a plurality of sonar wedges 30, such as the wedges 30A, 30B of FIG. 3 and the wedges 30C, 30D of FIG. 4, then the sonar wedges 30 may be transmitted by a plurality of transducer elements or one or more transducer arrays. The receive electronic signal generated by the frequency steered sonar element 12 may include sonar information from all of the sonar wedges 30. The receive electronic signal may be communicated to an external destination, such as the marine sonar display device 10 of the present technology.

Some implementations of the frequency steered sonar element 12 may also include electrical or electronic circuitry such as filters, amplifiers, multiplexors, digital to analog converters (DACs), analog to digital converters (ADCs), signal processors, or combinations thereof.

The implementations of the frequency steered sonar element 12 in FIGS. 3 and 4 show the frequency steered sonar element 12 being mounted on the bottom of a hull of a marine vessel. In general, the frequency steered sonar element 12 may be mounted anywhere on the hull below the waterline. The frequency steered sonar element 12 may be mounted directly on the hull or may be attached with brackets, transom and trolling mounts, and the like. In addition, the frequency steered sonar element 12 may be reoriented about one, two, or three axes through the use of a mechanism, such as a motor assembly. As an example, the frequency steered sonar element 12 may transmit the sonar wedges 30 in the angular directions of FIG. 3 and then be reoriented by a mechanism in order to transmit the sonar wedges 30 with the angular directions of FIG. 4. Furthermore, the frequency steered sonar element 12 may be configured for towing behind the marine vessel or for use with a remote operated vehicle (ROV) or autonomous vehicle associated with the marine vessel.

Turning now to the marine sonar display device 10, the housing 14, as shown in FIG. 1, generally encloses and protects the other components from moisture, vibration, impact, and interference. The housing 14 may include mounting hardware for removably securing the marine sonar display device 10 to a surface within the marine vessel or may be configured to be panel-mounted within the marine vessel. The housing 14 may be constructed from a suitable lightweight and impact-resistant material such as, for example, plastic, nylon, aluminum, or any combination thereof. The housing 14 may include one or more appropriate gaskets or seals to make it substantially waterproof or resistant. The housing 14 may take any suitable shape or size, and the particular size, weight and configuration of the housing 14 may be changed without departing from the scope of the present technology.

In certain embodiments, the marine sonar display device 10 may include a plurality of housings 14 if the various functions of the device 10 are separated. For example, the display 16 and the user interface 18 may be retained in a first housing 14 to provide viewing and user interaction functionality, while the memory element 24 and the processing element 26 may reside in a second housing (not shown in the figures) to provide signal processing functionality. Other electronic components, such as the communication element 20 and the location determining element 22 may reside in either one or both of the housings. In addition, some memory and processing capabilities may be include in both housings. Electronic communication between the two housings may be achieved through electrically conductive cables or wirelessly.

The display 16, as shown in FIG. 1, may include video devices of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 16 may possess a square or a rectangular aspect ratio and may be viewed in either a landscape or a portrait mode. In various embodiments, the display 16 may also include a touch screen occupying the entire screen or a portion thereof so that the display 16 functions as part of the user interface 18. The touch screen may allow the user to interact with the marine sonar display device 10 by physically touching, swiping, or gesturing on areas of the screen.

The user interface 18 generally allows the user to utilize inputs and outputs to interact with the marine sonar display device 10. Inputs may include buttons, pushbuttons, knobs, jog dials, shuttle dials, directional pads, multidirectional buttons, switches, keypads, keyboards, mice, joysticks, microphones, or the like, or combinations thereof. Outputs may include audio speakers, lights, dials, meters, or the like, or combinations thereof. With the user interface 18, the user may be able to control the features and operation of the display 16 and the marine sonar display device 10. For example, the user may be able to zoom in and out on the display 16 using either virtual onscreen buttons or actual pushbuttons. In addition, the user may be able to pan the image on the display 16 either by touching and swiping the screen of the display 16 or by using multidirectional buttons or dials.

The communication element 20 generally allows communication with external systems or devices. The communication element 20 may include signal or data transmitting and receiving circuits, such as antennas, amplifiers, filters, mixers, oscillators, digital signal processors (DSPs), and the like. The communication element 20 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 20 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 20 may establish communication through connectors or couplers that receive metal conductor wires or cables or optical fiber cables. The communication element 20 may be in communication with the processing element 26 and the memory element 24.

The location determining element 22 generally determines a current geolocation of the marine sonar display device 10 and may receive and process radio frequency (RF) signals from a global navigation satellite system (GNSS) such as the global positioning system (GPS) primarily used in the United States, the GLONASS system primarily used in the Soviet Union, or the Galileo system primarily used in Europe. The location determining element 22 may accompany or include an antenna to assist in receiving the satellite signals. The antenna may be a patch antenna, a linear antenna, or any other type of antenna that can be used with location or navigation devices. The location determining element 22 may include satellite navigation receivers, processors, controllers, other computing devices, or combinations thereof, and memory. The location determining element 22 may process a signal, referred to herein as a "location signal", from one or more satellites that includes data from which geographic information such as the current geolocation is derived. The current geolocation may include coordinates, such as the latitude and longitude, of the current location of the marine sonar display device 10. The location determining element 22 may communicate the current geolocation to the processing element 26, the memory element 24, or both.

Although embodiments of the location determining element 22 may include a satellite navigation receiver, it will be appreciated that other location-determining technology may be used. For example, cellular towers or any customized transmitting radio frequency towers can be used instead of satellites may be used to determine the location of the marine sonar display device 10 by receiving data from at least three transmitting locations and then performing basic triangulation calculations to determine the relative position of the device with respect to the transmitting locations. With such a configuration, any standard geometric triangulation algorithm can be used to determine the location of the marine sonar display device 10. The location determining element 22 may also include or be coupled with a pedometer, accelerometer, compass, or other dead-reckoning components which allow it to determine the location of the marine sonar display device 10. The location determining element 22 may determine the current geographic location through a communications network, such as by using Assisted GPS (A-GPS), or from another electronic device. The location determining element 22 may even receive location data directly from a user.

The memory element 24 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

The processing element 26 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like. The processing element 26 may also include hardware components such as finite-state machines, sequential and combinational logic, and other electronic circuits that can perform the functions necessary for the operation of the current invention. The processing element 26 may be in communication with the other electronic components through serial or parallel links that include universal busses, address busses, data busses, control lines, and the like.

Figure 5:
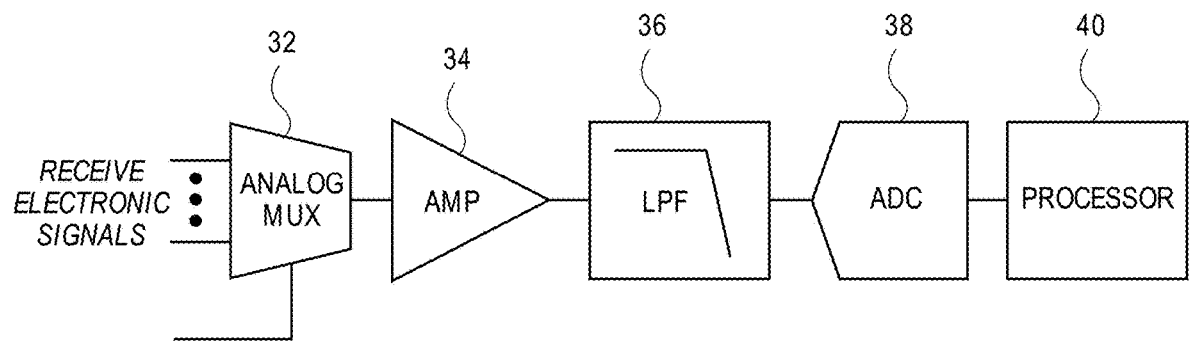
FIG. 5 is a schematic block diagram of at least a portion of the components of electronic circuitry that may be utilized with the marine sonar display device to process signals from the frequency steered sonar element.

In some embodiments, the processing element 26 may further include the electronic circuitry of FIG. 5. In other embodiments, the processing element 26 may be in communication with the electronic circuitry of FIG. 5. The electronic circuitry may include an optional analog multiplexer (MUX) 32, an amplifier 34, a low pass filter 36, an analog to digital converter (ADC) 38, and a processor 40. The analog MUX 32 may include generally known electronic circuitry, such as a plurality of transistor-based switches, that provide a signal selection function. The analog MUX 32 typically has a plurality of select control lines, a plurality of analog signal inputs, and one output. The analog MUX 32 allows one of the inputs to pass through to the output. When utilized with the current technology, the analog MUX 32 has the receive electronic signals as inputs. Based on the state of the select control lines, the analog MUX 32 presents one of the receive electronic signals at the output. When the analog MUX 32 is not included, the receive electronic signal is communicated directly to the amplifier 34.

The amplifier 34 may include small signal amplifier circuits as are generally known. The amplifier 34 may amplify the receive electronic signal communicated from the analog MUX 32, if included. Otherwise, the amplifier 34 may amplify the receive electronic signal as received from the frequency steered sonar element 12. The amplifier 34 may have fixed gain or variable gain. The amplifier 34 may have a frequency response that filters the received electronic signal. The frequency response of amplifier 34 may be low pass, high pass, band pass, or all pass in behavior.

The low pass filter 36 may include filtering circuitry which passes frequencies of a signal lower than a certain cutoff frequency and filters frequencies greater than the cutoff, as is generally known. The low pass filter 36 may function as an anti-aliasing filter. Thus, the cutoff frequency may be chosen to be approximately twice the maximum frequency component of the receive electronic signal. The low pass filter 36 may filter the receive electronic signal communicated from the amplifier 34.

The ADC 38 may include generally known circuitry capable of or configured to sample an analog signal and generate digital data which corresponds to the sampled analog values. The ADC 38 may convert the receive electronic signal communicated from the low pass filter 36 into digital data that may be presented in a serial or parallel stream.

The processor 40 may include DSPs, FPGAs, ASICs, or the like. In various embodiments, the processor 40 may be the same component as, or integrated with, the processing element 26. The processor 40 along with the other components of FIG. 5 may perform the signal processing of the receive electronic signals discussed below in addition to, or instead of, the processing element 26.

By utilizing hardware, software, firmware, or combinations thereof, the processing element 26 may perform the following functions. The processing element 26 may operate the frequency steered sonar element 12 in order to receive signals and/or data that can be converted into sonar images. In order for the frequency steered sonar element 12 to perform a sweep, the processing element 26 may generate a transmit electronic signal. As discussed above, the transmit electronic signal may include one or more single-ended electronic signals or one or more differential electronic signals. The processing element 26 may be preprogrammed with the parameters of the signal, such as frequency, etc., or may determine the parameters based on the performance specifications of the frequency steered sonar element 12. In some embodiments, the processing element 26 may generate the transmit electronic signal as a sequence of spaced-apart-in-time pulses, wherein each pulse is an oscillating electrical voltage or electrical current that includes one of a plurality of frequency components. Thus, the processing element 26 may generate a first pulse including a first frequency component, wait for a period of time, generate a second pulse including a second frequency component, wait for the period of time, generate a third pulse including a third frequency component, and so forth. For example, using the preceding method, the processing element 26 may generate the transmit electronic signal as a sequence of four pulses, each including a different frequency component. In other embodiments, the processing element 26 may generate the transmit electronic signal as at least one broadband pulse that includes a plurality of frequency components. As an example, the processing element 26 may generate the broadband pulse to include four frequency components. The number of frequency components to include in the transmit electronic signal may be determined based on the specifications of the frequency steered sonar element 12, the construction of the display 16, user selected settings, or the like.

With the exemplary frequency steered sonar element 12 of FIGS. 3 and 4, the processing element 26 may generate the transmit electronic signal, with either a sequence of four single frequency component pulses or a broadband pulse that includes four frequency components, which will cause the frequency steered sonar element 12 to transmit the sonar beams 28 in the appropriate angular directions, so that after all of the sonar beams 28 have been transmitted, at least one sonar wedge 30 is formed. Depending on the implementation of the frequency steered sonar element 12, the processing element 26 may adjust characteristics or features of the transmit electronic signal, such as generating a plurality of differential electronic signals with the relative phase delay between the signals being adjusted, in order to determine the number of sonar wedges 30 that are transmitted and the general direction in which each is transmitted.

The processing element 26 may communicate the electronic signal to the frequency steered sonar element 12. The transmit electronic signal may present or include analog signals, digital signals, digital data, or combinations thereof. Under normal operation, the processing element 26 may repeatedly or continuously generate and communicate the transmit electronic signal so as to ultimately produce sonar images in motion.

The processing element 26 may receive a receive electronic signal from the frequency steered sonar element 12 as the sonar element 12 receives reflections of the sonar beams 28. As discussed above, the receive electronic signal may include one or more single-ended electronic signals or one or more differential electronic signals. The receive electronic signal may include a steady stream of data or activity as the result of receiving reflections of the sonar beams 28 from various angular directions. Furthermore, as discussed above, the receive electronic signal may include a plurality of frequency components, each of which may be associated with one of the sonar beams 28 and may indicate the angular direction from which reflections of the sonar beam 28 were received. Typically, the frequency components of the receive electronic signal are the same as the frequency components of the transmit electronic signal. The processing element 26 may analyze the receive electronic signal and determine the frequency components thereof. As an example, the processing element 26 may repeatedly perform frequency domain transforms, such as a fast Fourier transform (FFT), to determine the frequency components of the receive electronic signal. The processing element 26 may calculate an array of sonar data slices, each sonar data slice including sonar data that is calculated from one of the frequency components of the receive electronic signal. For example, each sonar data slice may include characteristics such as an amplitude and a delay, among others, of a particular frequency component of the receive electronic signal. Each sonar data slice includes sonar data for one sonar beam 28 of one sonar wedge 30, and the array of sonar data slices includes all of the sonar data for one sonar wedge 30. The processing element 26 generally performs the sonar data slice calculations on a repeated or continuous basis.

If two sonar wedges 30 are generated, as shown in FIGS. 3 and 4, then the processing element 26 may perform different operations depending on the implementation of the frequency steered sonar element 12. Some implementations of the frequency steered sonar element 12 may generate the receive electronic signal upon which the processing element 26 may perform beam forming mathematical calculations, including a complex FFT, among others, in order to determine a first array of sonar data slices, corresponding to the first sonar wedge 30A or 30C, and a second array of sonar data slices, corresponding to the second sonar wedge 30B or 30D.

The processing element 26 may generate an array of sonar image slices 42 for each sonar wedge 30. Each sonar image slice 42 may be generated from a corresponding one of the array of sonar data slices and may be associated with the angular direction of the receive electronic signal from which the sonar data slice was calculated. Each sonar image slice 42 may include the sonar imagery for a region of the water associated with the sonar beam 28 at the corresponding angular direction. The entire array of sonar image slices 42 may include the sonar imagery for all of one sonar wedge 30.

Figure 6:
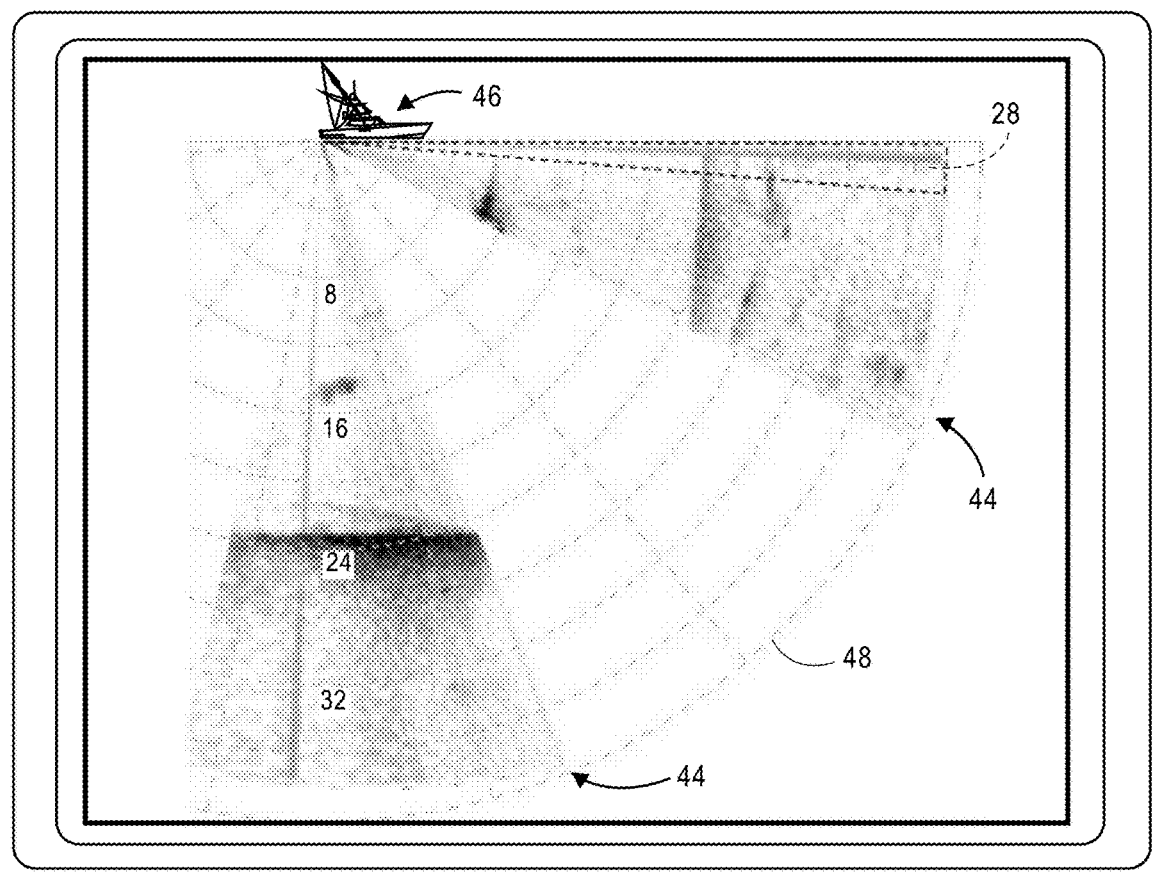
FIG. 6 is a screen capture taken from the display of the marine sonar display device presenting a forward-projecting near real time sonar wedge image and a downward-projecting near real time sonar wedge image.

During normal operation, the processing element 26 may repeatedly or continuously generate the transmit electronic signal to sweep the sonar beam 28. In turn, the processing element 26 may repeatedly calculate the array of sonar data slices. And, the processing element 26 may repeatedly generate the array of sonar image slices 42, one for each array of sonar data slices. In addition, the processing element 26 may control the display 16 to repeatedly present the array of sonar image slices 42, which forms a sonar wedge image 44. Since there is little delay between the processing element 26 generating the transmit electronic signal and the processing element 26 generating the resulting, associated sonar wedge image 44, the sonar wedge images 44 may be considered "near real time". Furthermore, the processing element 26 may control the display 16 to present one near real time sonar wedge image 44 for each sonar wedge 30 that is transmitted by the frequency steered sonar element 12. An example is shown in FIG. 6, wherein the display 16 may present a first near real time sonar wedge image 44 for a first sonar wedge 30 transmitted in the forward direction of the marine vessel and a second near real time sonar wedge image 44 for a second sonar wedge 30 transmitted in the downward direction. (In FIG. 6, one of the sonar image slices 42 for the first near real time sonar wedge image 44 is illustrated in dashed lines. The dashed lines may not normally be presented on the display 16.)

The processing element 26 may additionally control the display 16 to present indicia 46 to depict the marine vessel. The indicia 46 may be positioned with regard to the near real time sonar wedge images 44 to properly portray the relationship between the marine vessel and the sonar wedges 30. The processing element 26 may further control the display 16 to present a circular grid 48 to depict the ranges of distance in the water from the frequency steered sonar element 12. Alternatively or additionally, the processing element 26 may further control the display 16 to present a rectangular grid.

The processing element 26 may store in the memory element 24 a plurality of arrays of sonar data slices. In various embodiments, the processing element 26 may store the sonar data slice arrays for a certain period of time—say, 30 seconds, 1 minute, 2 minutes, etc. Alternatively or additionally, the processing element 26 may store the sonar data slice arrays for a certain number of frames to be presented on the display 16.

Figure 7A:
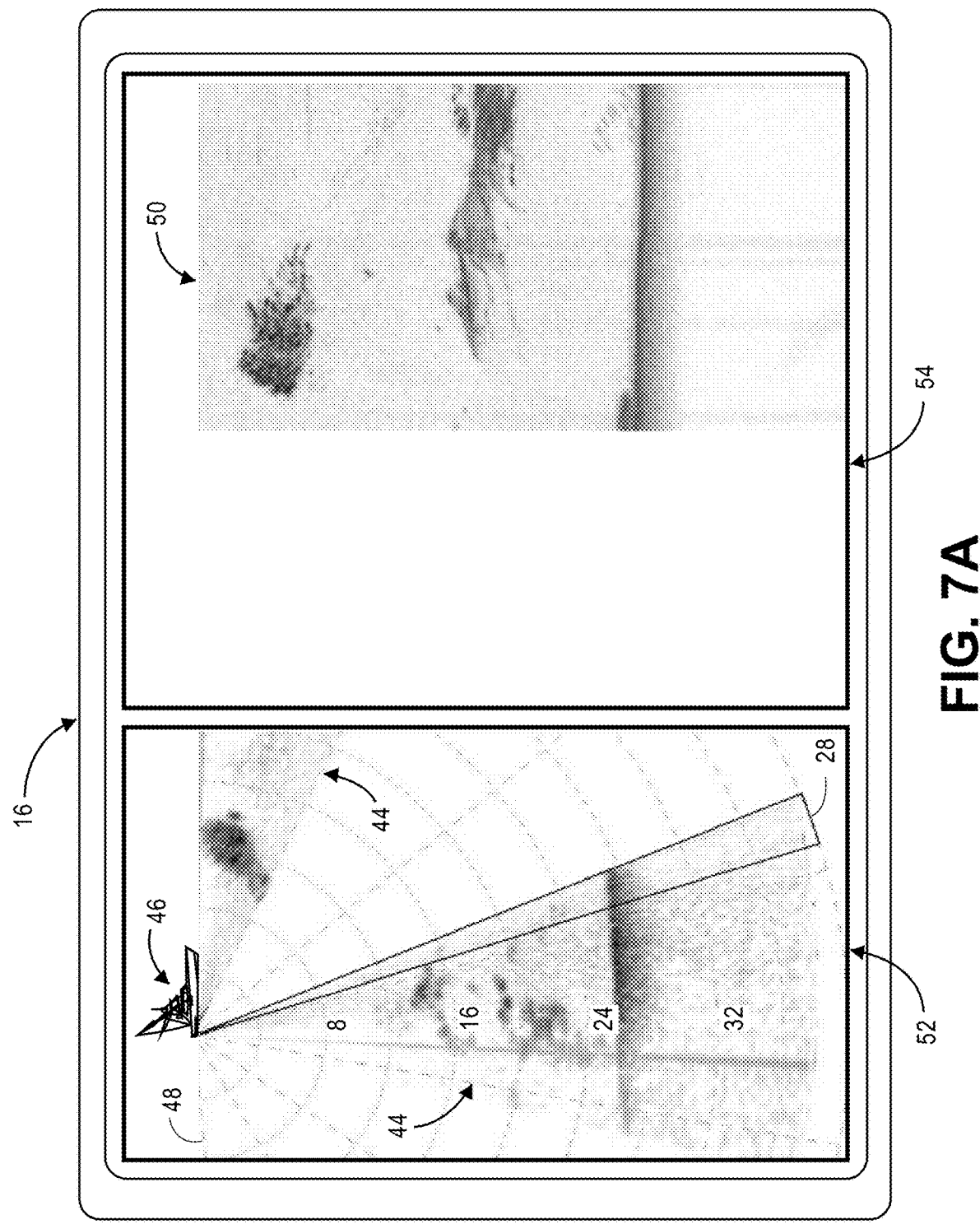
FIGS. 7A and 7B are screen captures taken from the display of the marine sonar display device presenting near real time sonar wedge images in a first window and a historical sonar image in a second window with the historical sonar image of FIG. 7A scrolling left to create the historical sonar image of FIG. 7B.
Figure 7B:
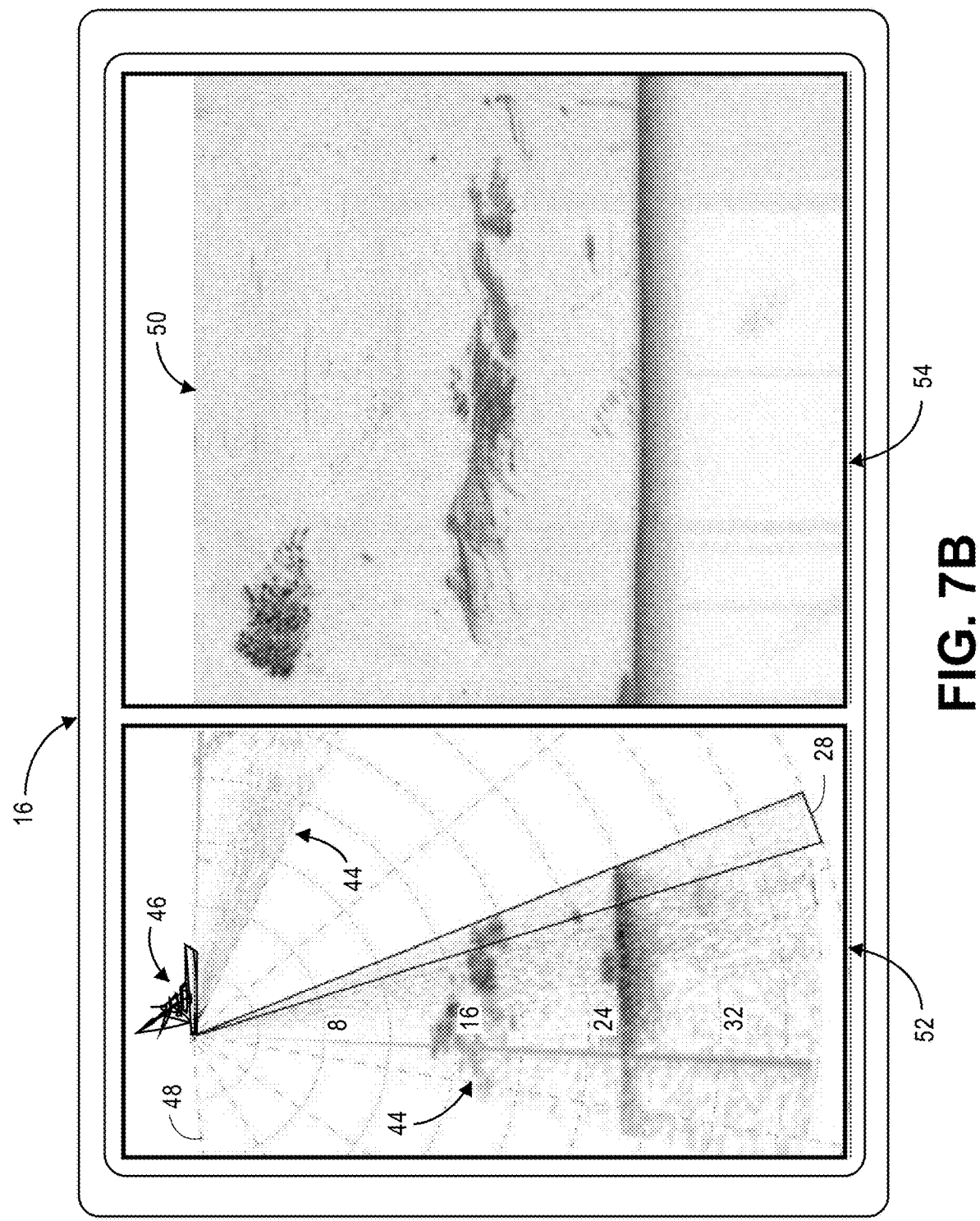

The processing element 26 may generate a historical sonar image 50 formed from the previously generated sonar image slices 42 derived from one or more sonar beams 28. In various embodiments, the processing element 26 may retrieve previously stored sonar data slices in order to generate the historical sonar image 50. The processing element 26 may further control the display 16 to present the historical sonar image 50. In exemplary embodiments shown in FIGS. 7A and 7B, the processing element 26 may present one historical sonar image 50 on a portion of the display 16. In some embodiments, the processing element 26 may crop a portion of one or more of the near real time sonar wedge images 44 and present them in a first window 52 or frame, while presenting the historical sonar image 50 in a second window 54. In other embodiments, the processing element 26 may not crop the near real time sonar wedge images 44. Alternatively, the processing element 26 may present only the historical sonar image 50 in the first window 52 and may not present any of the near real time sonar wedge images 44. As shown in FIGS. 7A and 7B, one sonar image slice 42 (representing the reflections from one sonar beam 28) has been selected from the downward directed near real time sonar wedge image 44 for which the historical sonar image 50 is generated. Typically, the sonar image slice 42, for which the historical sonar image 50 is generated, is highlighted on the display 16 such as with a different color or an outline. A user may select the sonar image slice 42 using the user interface 18, or the processing element 26 may automatically select the sonar image slice 42 based on various signal and/or system parameters, such as merit, sensitivity, signal to noise, orientation, beamwidth, combinations thereof, and the like. In addition, more than one adjacent sonar image slice 42 may be selected for which the historical sonar image 50 is generated. The sonar image slices 42 may, for example, be averaged, weighted averaged, summed, or the like when they used to generate the historical sonar image 50.

When the processing element 26 is controlling the display 16 to present the historical sonar image 50, the most recently generated sonar image slice 42 may be presented in a fixed or constant location in the second window 54. Those sonar image slices 42 that were previously generated may scroll in the second window away from the most recently generated sonar image slice 42 with the oldest sonar image slice 42 being farthest away from the most recently generated sonar image slice 42. In the embodiment of FIGS. 7A and 7B, the sonar image slices 42 scroll from right to left in the second window. In FIG. 7A, the sonar image slices 42 for, say, the previous 15 seconds, or the last 50 feet that the marine vessel has traveled, are shown on the display 16, while in FIG. 7B, the sonar image slices 42 for, say, the previous 30, or the last 100 feet that the marine vessel has traveled, seconds are shown, with those sonar image slices 42 from FIG. 7A having scrolled to the left.

Figure 8:
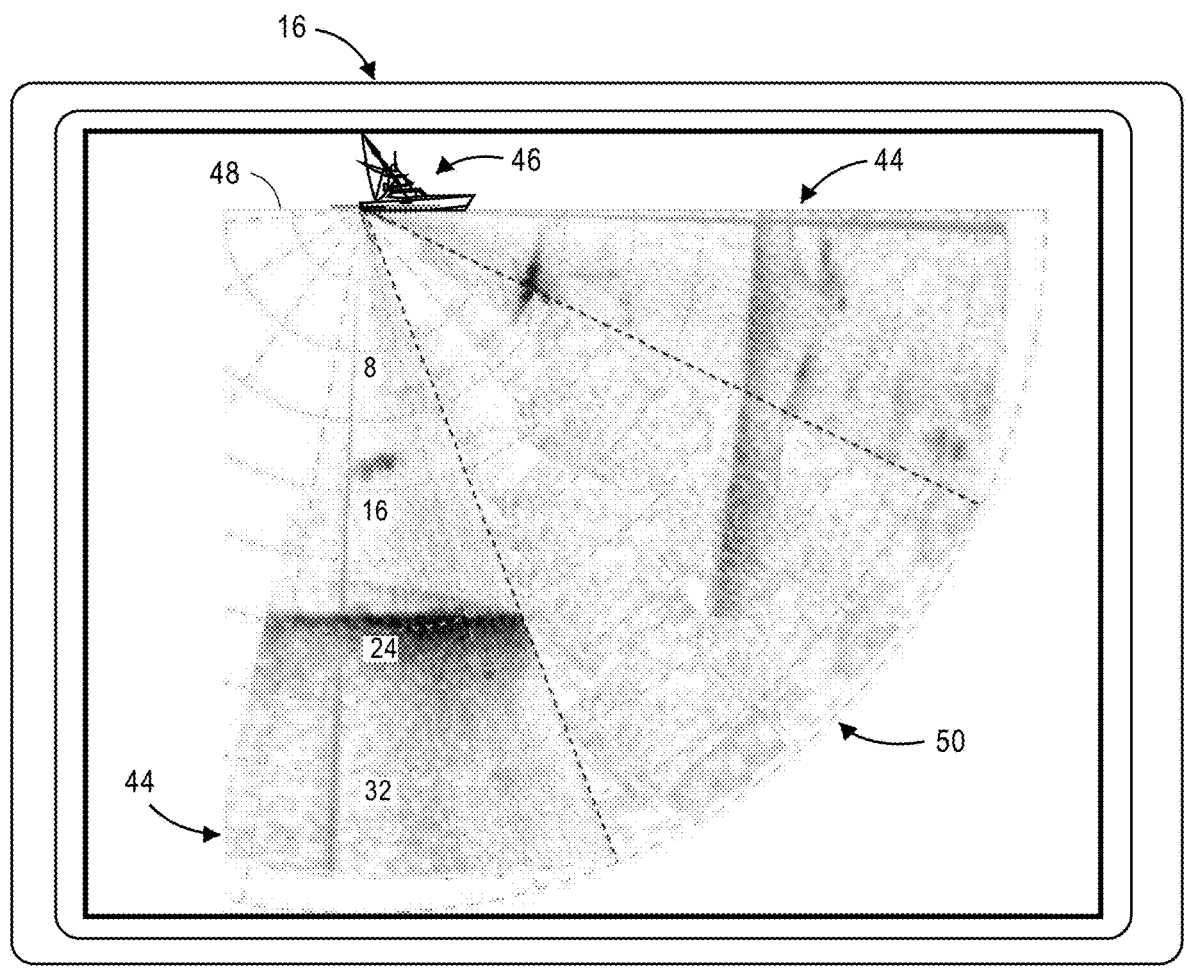
FIG. 8 is a screen capture taken from the display of the marine sonar display device presenting a forward-projecting near real time sonar wedge image, a spaced apart downward-projecting near real time sonar wedge image, and a historical sonar image positioned therebetween.

The processing element 26 may further control the display 16 to present one or more near real time sonar wedge images 44 and one or more historical sonar images 50 in the same window. When a plurality of near real time sonar wedge images 44 is presented, the user may select which near real time sonar wedge image 44 and which sonar image slice(s) 42 are utilized to generate the historical sonar image 50. Alternatively, the processing element 26 may select these parameters. In the exemplary embodiment of FIG. 8, a first near real time sonar wedge image 44 projecting in the forward direction and a second near real time sonar wedge image 44 projecting in the downward direction, similar to those of FIG. 6, are presented. (The inner boundaries of the near real time sonar wedge images 44 are shown on the display 16 in dashed lines. The boundaries are shown here for illustrative purposes and may not necessarily be shown during normal operation of the marine sonar display device 10.) In the embodiment of FIG. 8, the processing element 26 may control the display 16 to present the history of one or more sonar image slices 42 selected from the forward projecting near real time sonar wedge image 44. The history may be presented as described above, with the most recently generated sonar image slice 42 being presented in a fixed location and the previously generated sonar image slices 42 scrolling away. In other embodiments, the processing element 26 may select a vertical column of the sonar image, as it is shown on the display 16, to fill the gap between the two near real time sonar wedge images 44. Thus, the processing element 26 may select a portion of multiple sonar image slices 42 for filling the gap. In the exemplary embodiment of FIG. 8, the most recently generated sonar image slice 42 is presented adjacent to the forward projecting near real time sonar wedge image 44 and the previously generated sonar image slices 42 scroll toward the downward projecting near real time sonar wedge image 44. Thus, the historical sonar images may fill the gap between the two near real time sonar wedge images 44 and may give the appearance of having a single near real time sonar wedge image 44 that covers a greater volume in the water than just the two separated near real time sonar wedge images 44. In addition, the processing element 26 may control the display 16 to present the marine vessel indicia 46 and overlay the near real time sonar wedge images 44 and the historical sonar image 50 on the circular grid 48.

The processing element 26 may also track the course of the marine vessel through data provided from the location determining element 22, or additionally or alternatively from information from a steering or helm system of the marine vessel, data from accelerometers or inertial sensors associated with the frequency steered sonar element 12, or other devices or systems utilized with the marine vessel. When the processing element 26 determines a change in course or heading of the marine vessel, or receives information that a course change has occurred, the processing element 26 may control the display 16 to remove at least a portion of the historical sonar image 50, such as the historical sonar images 50 of FIG. 7A, 7B, or 8, so that at least part of the space on the display 16 is at least temporarily blank. The processing element 26 may resume controlling the display 16 to present the historical sonar image 50 when a new course has been determined.

Figure 9A:
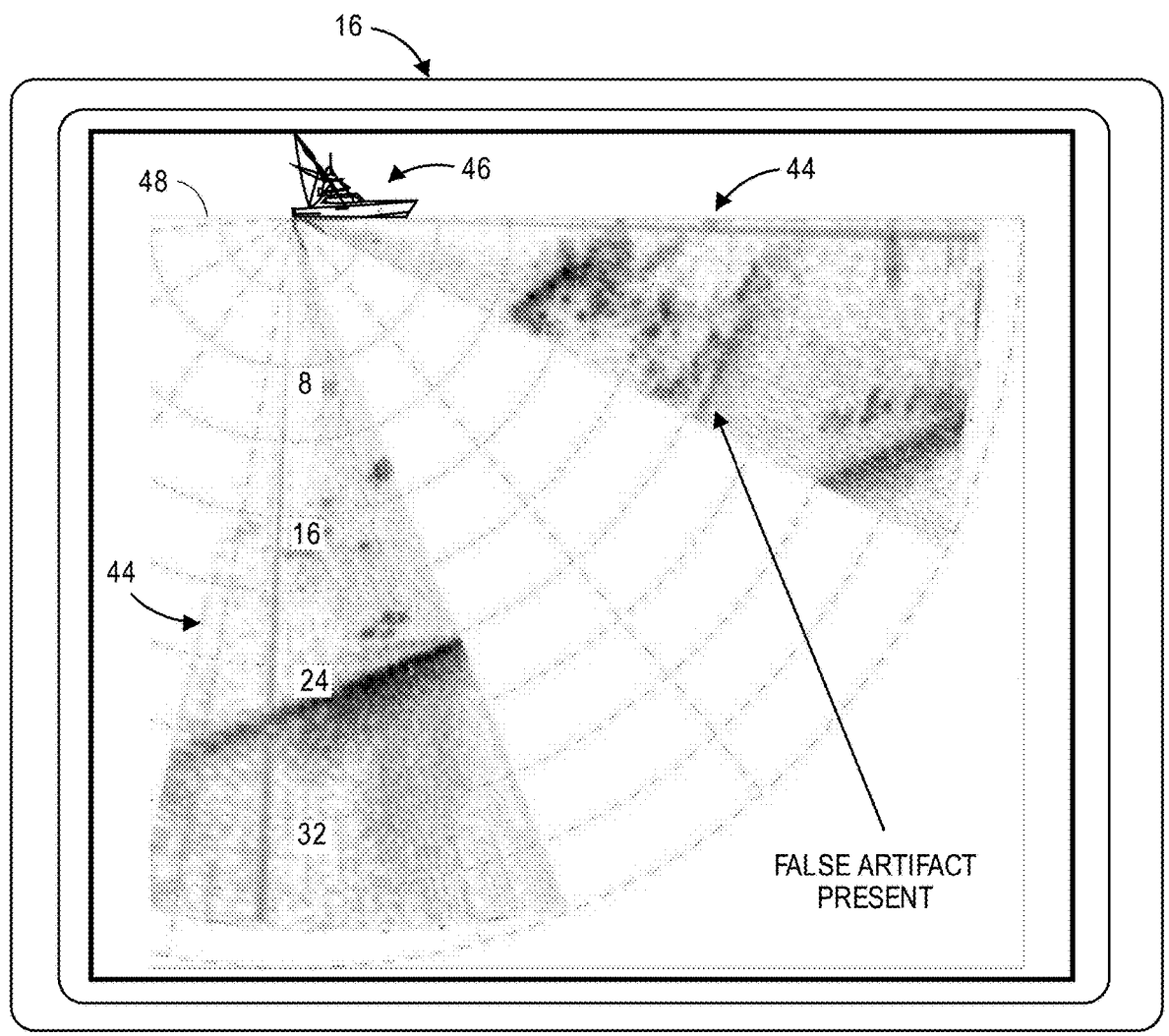
FIGS. 9A and 9B are screen captures taken from the display of the marine sonar display device presenting a forward-projecting near real time sonar wedge image and a downward-projecting near real time sonar wedge image, wherein there is a false artifact present in FIG. 9A which is removed in FIG. 9B.
Figure 9B:
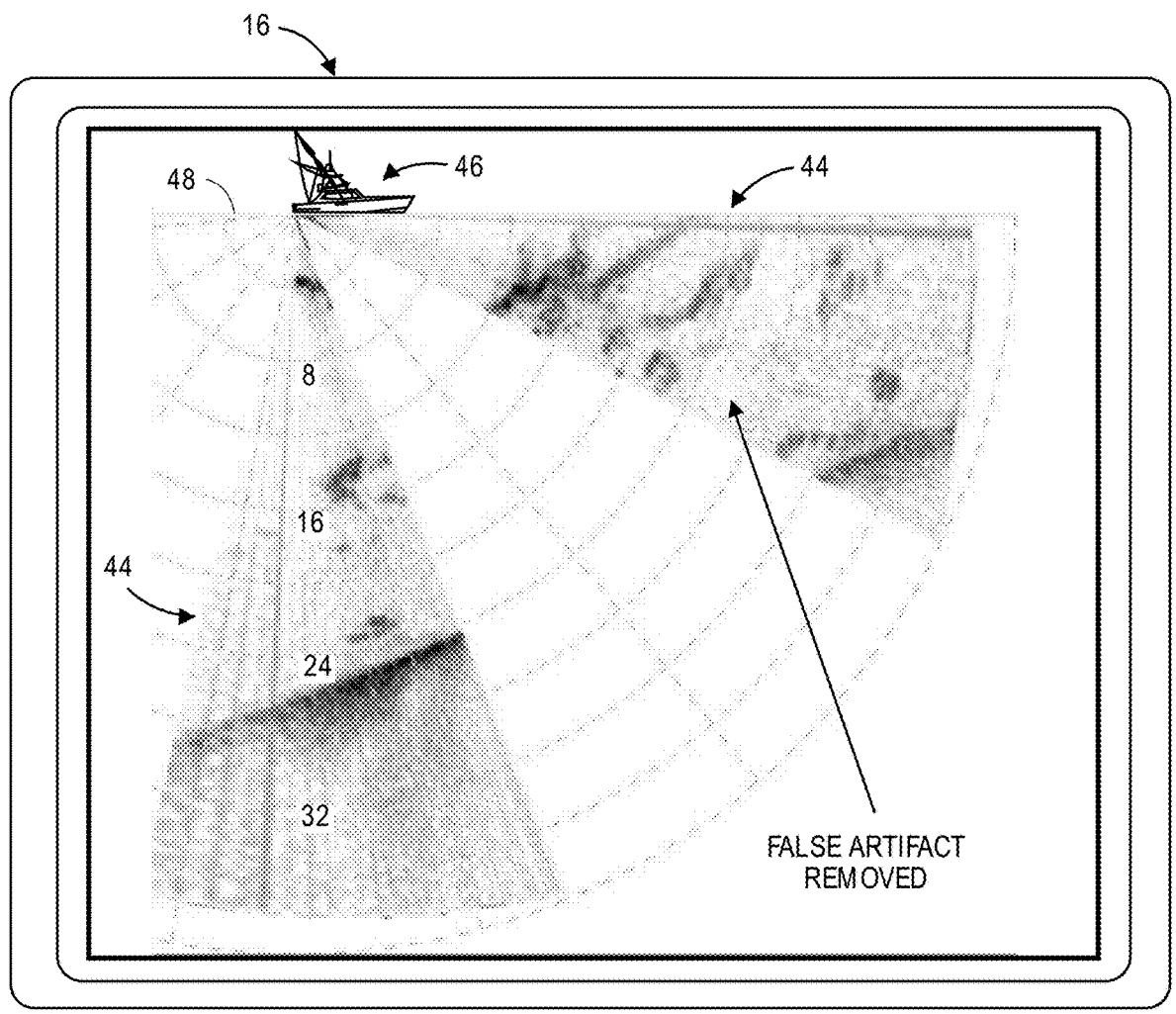

The processing element 26 may analyze the sonar data slices of any of the near real time sonar wedge images 44 that are being presented on the display 16 to determine whether false or undesirable artifacts, or ghost images, are included in the near real time sonar wedge images 44. In certain embodiments, this feature may be a menu option that the user can select to clear up the images on the display 16. The false artifacts may be the result of reflections from downward-projecting sonar beams 28 being interpreted as reflections from forward-projecting sonar beams 28. The false artifacts may also be the result of crosstalk events, such as electrical non-isolation electrical interference, sampling mismatch when the analog receive electronic signals are converted to digital data, among other causes. An example of a false artifact being present in the near real time sonar wedge image 44 is shown in the forward-projecting near real time sonar wedge image 44 of FIG. 9A. The processing element 26 may perform data subtraction, crosstalk removal algorithms, or the like, or combinations thereof on one or more of the sonar data slices each time the false artifact is present to remove the false artifact from the near real time sonar wedge image 44. An example in the near real time sonar wedge image 44 after the false artifact is removed is shown in FIG. 9B.

Figure 10A:
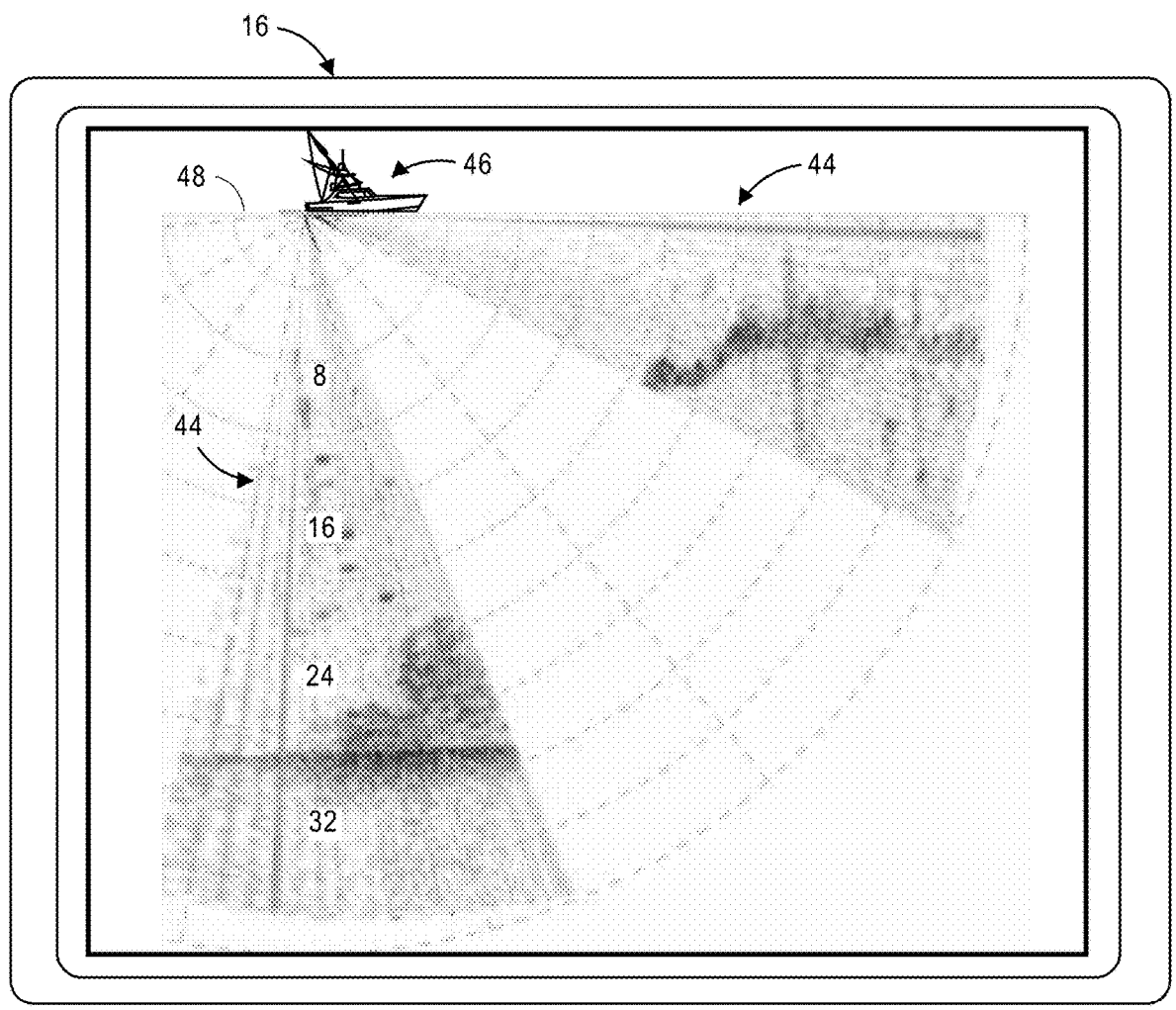
FIGS. 10A and 10B are screen captures taken from the display of the marine sonar display device presenting a forward-projecting near real time sonar wedge image and a downward-projecting near real time sonar wedge image, wherein the images of FIG. 10A are not edge filtered, while the images of FIG. 10B are edge filtered.
Figure 10B:
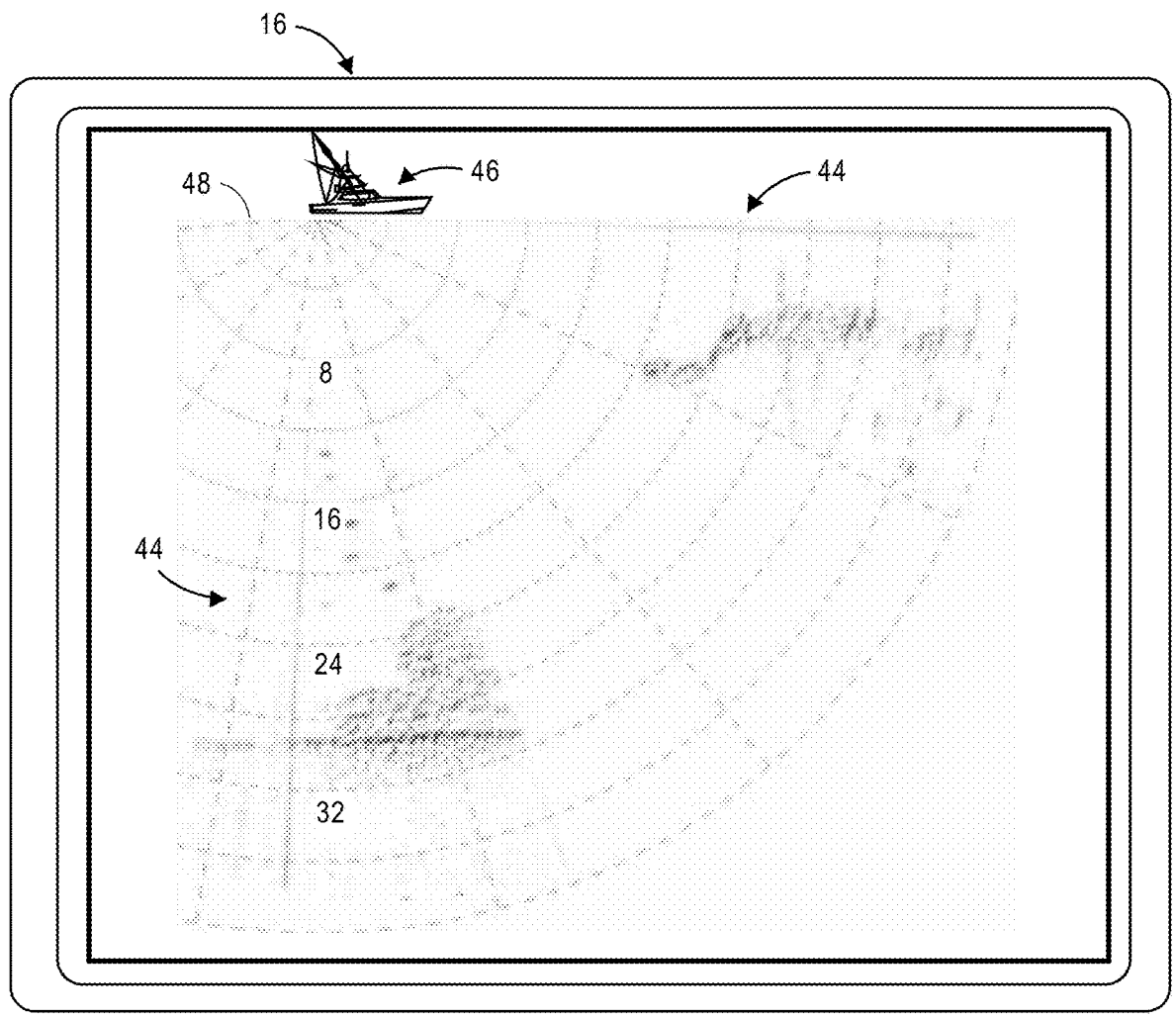

The processing element 26 may also perform various signal processing functions. The processing element 26 may provide image enhancement by adjusting frequency properties of the sonar data, such as by adjusting the data of the sonar data slices. Examples of the image enhancement processing may include fading by frequency, variable noise thresholds by frequency, variable gain by frequency (including time variable gain (TVG), dynamic/automatic gain), color palette differences by frequency band (highlighting features, highlighting recognized objects such as fish, lure, structure), combinations thereof, and the like. Such functionality may provide a more normalized near real time sonar wedge image 44. The processing element 26 may also provide multi-frame averaging to smooth the near real time sonar wedge images 44. For example, frame depth, or frame count to be averaged, may be based on the motion of the marine vessel or the frequency steered sonar element 12. Such functionality may reduce background noise to provide a more clear near real time sonar wedge image 44. Additionally or alternatively, the processing element 26 may adjust some characteristic of each sonar image slice 42, such as intensities, colors, etc. of the objects in the slice 42, by weighted averaging the characteristics of the sonar image slice 42 with the characteristics of the neighboring sonar image slices 42. The processing element 26 may further provide edge filtering to enable greater image contrast and improve object identification. An example of the processing element 26 performing edge filtering on near real time sonar wedge images 44 is shown in FIGS. 10A and 10B. Forward-projecting and downward-projecting near real time sonar wedge images 44 under normal conditions without edge filtering are shown in FIG. 10A. The same forward-projecting and downward-projecting near real time sonar wedge images 44 with edge filtering activated are shown in FIG. 10B.

The processing element 26 may further determine the side of the marine vessel on which an object in the water is located when the frequency steered sonar element 12 is in a forward direction and/or downward direction configuration. That is, the processing element 26 may determine whether an underwater object is in the port side of the water or the starboard side of the water with respect to the marine vessel. The determination may be made by analyzing the signal strength, such as amplitude, intensity, energy level, etc., of the receive electronic signals. The signal strength of the reflections of the sonar beams 28 may vary according to the wobble or roll in the water of the frequency steered sonar element 12. The wobble of the frequency steered sonar element 12 may be the result of natural water and/or marine vessel motion or may be artificially induced by mechanical devices. The wobble motion and/or direction may be detected by electromechanical components, such as accelerometers and inertial sensors, that are in communication with the processing element 26. The direction of roll of the frequency steered sonar element 12 may be correlated with the signal strength of the receive electronic signals to determine whether an underwater object is in the port side of the water or the starboard side of the water. In some embodiments, once the side of each detected underwater object is determined, the processing element 26 may generate port sonar image slices which include underwater objects determined to be on the port side and starboard sonar image slices which include underwater objects determined to be on the starboard side. The processing element 26 may also control the display 16 to present the port sonar image slices in a first window and the starboard image objects in a second window. In other embodiments, once the side of each detected underwater object is determined, the processing element 26 may assign a color to each object when the object is presented on the display 16. For example, the processing element 26 may assign a first color, such as blue, to port underwater objects, while the processing element 26 may assign a second color, such as red, to starboard objects. The processing element 26 may then control the display 16 to present one or more near real time sonar wedge images 44, wherein the underwater objects are colored as previously mentioned according to whether they are located in the port side of the water or the starboard side of the water.

The marine sonar display device 10 may operate as follows. The marine sonar display device 10 may be electrically connected to the frequency steered sonar element 12 by at least one cable through which the marine sonar display device 10 may send the transmit electronic signals to the frequency steered sonar element 12 and receive the receive electronic signals therefrom. After the marine sonar display device 10 has been turned on and completed a self check sequence, it may automatically begin transmitting the transmit electronic signal to the frequency steered sonar element 12. The transmit electronic signal may include a plurality of frequency components—either as a single broadband pulse or as a sequence of single frequency component pulses. The transmit electronic signal typically includes the appropriate number of frequency components necessary for the frequency steered sonar element 12 to transmit a sonar wedge 30. The processing element 26 may repeatedly or continuously generate the transmit electronic signal and the signal may repeatedly or continuously be transmitted to the frequency steered sonar element 12.

The frequency steered sonar element 12 may repeatedly or continuously sweep the sonar beam 28, as described above, and may repeatedly or continuously generate a receive electronic signal which is received by the marine sonar display device 10. The receive electronic signal may include approximately the same number of frequency components as the transmit electronic signal. Each frequency component of the receive electronic signal may indicate the direction from which reflections of one of the sonar beams 28 were received. The processing element 26 may calculate an array of sonar data slices for each sonar wedge 30 that was transmitted into the water, wherein each sonar data slice is calculated from data (such as phase, amplitude, and delay) from one of the frequency components of the receive electronic signal. The processing element 26 may further generate an array of sonar image slices 42 for each array of sonar data slices, wherein each sonar image slice 42 is generated from one or more of the sonar data slices. One array of sonar image slices 42 forms one sonar wedge image 44. The calculation of sonar data slices and the generation of sonar image slices 42 and in turn sonar wedge images 44 are performed repeatedly and without much delay from the generation of the corresponding transmit electronic signals so that the sonar wedge images 44 are near real time sonar wedge images 44. The near real time sonar wedge images 44 may be presented on the display 16, as shown in FIG. 6, wherein a forward-projecting near real time sonar wedge image 44 and a downward-projecting near real time sonar wedge image 44 are presented.

The marine sonar display device 10 may include a menu that is presented on the display 16 and allows the user to select any of the abilities, operating modes, or options discussed above and below. The menu may be accessed through the user interface 18 by utilizing touchscreen functions or hardware components such as buttons or knobs located on the housing 14.

The marine sonar display device 10 may be operable to present historical sonar images 50 on the display 16. As shown in FIGS. 7A and 7B, the marine sonar display device 10 may present one or more near real time sonar wedge images 44 in a first window 52 and, in a second window 54, one historical sonar image 50 derived from one of the near real time sonar wedge images 44. The historical sonar image 50 includes previously-generated sonar image slices 42 from one of the near real time sonar wedge images 44. The sonar image slice 42 may be selected by the user or by the processing element 26. The previously-generated sonar image slices 42 (in the historical sonar image 50) may scroll to the left on the display 16, as shown in the figures, wherein the sonar image slices 42 on the right of the second window in FIG. 7A have scrolled to the left in the second window of FIG. 7B.

The marine sonar display device 10 may be operable to present historical sonar images 50 on the display 16 in the same window as the near real time sonar wedge images 44. When the marine sonar display device 10 is presenting two near real time sonar wedge images 44, such as the forward-projecting near real time sonar wedge image 44 and the downward-projection near real time sonar wedge image 44 with a space therebetween, the marine sonar display device 10 may fill the space with a historical sonar image 50 derived from the forward-projecting near real time sonar wedge image 44, as shown in FIG. 8.

The marine sonar display device 10 may be operable to remove false artifacts that are included in of the one near real time sonar wedge images 44. An example of this ability is shown in FIGS. 9A and 9B, wherein a false artifact, possibly resulting from reflections of the water bottom, is present in the forward-projecting near real time sonar wedge image 44 of FIG. 9A. The false artifact is removed in the forward-projecting near real time sonar wedge image 44 of FIG. 9B.

The marine sonar display device 10 may be operable to perform edge filtering on the sonar data slices used to generate the near real time sonar wedge images 44. The edge filtering may clean up some of the clutter shown in the near real time sonar wedge images 44. An example of the near real time sonar wedge images 44 with edge filtering off is shown in FIG. 10A. An example of the near real time sonar wedge images 44 with edge filtering on is shown in FIG. 10B.

Referring now to FIGS. 11-17, various example transducer assemblies are provided. Specifically referring to FIGS. 12-13, a frequency steered array assembly 58 is illustrated having a first frequency steered array element 12a, a second frequency steered array element 12b, and a third frequency steered array element 12c. Each of the elements 12a, 12b, 12c may be configured as described above with respect to frequency steered sonar element 12. For example, each of the elements 12a, 12b, 12c may comprise a plurality of piezoelectric elements as described above.

Figure 13:
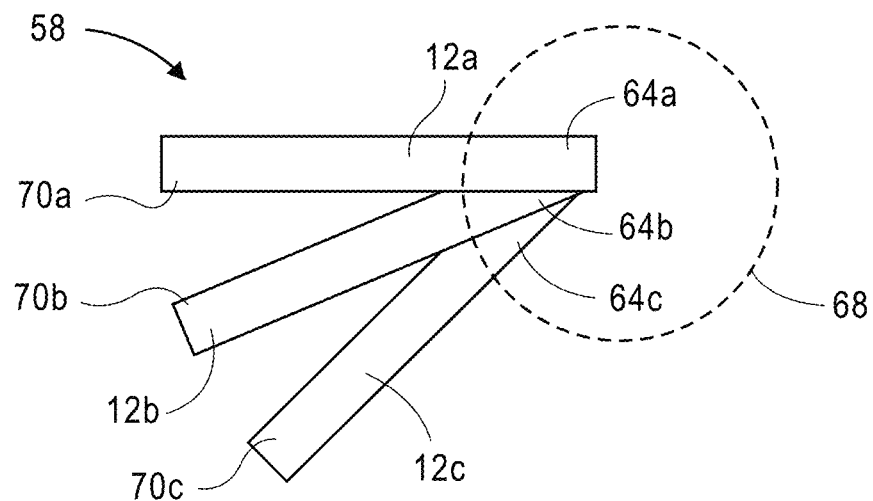
FIG. 13 is a schematic view of an example sonar transducer assembly, wherein the frequency steered transducer elements of the assembly are arranged in a fan-shaped configuration.

FIG. 13 illustrates an example fan-shaped configuration of the elements 12a, 12b, 12c. Each of the elements 12a, 12b, 12c may be configured as described above with respect to frequency steered sonar element 12. Each element 12a, 12b, 12c is configured to receive a transmit electronic signal, including a plurality of frequency components, and to transmit an array of sonar beams into a body of water. Each sonar beam is transmitted in an angular direction that varies according to one of the frequency components of the transmit electronic signal.

In the example of FIG. 13, end sections 64a, 64b, 64c of elements 12a, 12b, 12c are within an intersection range 68 of each other. The intersection range 68 is an area in which at least two of the end sections 64a, 64b, 64c are positioned such that at least two distal ends 70a, 70b, 70c of elements 12a, 12b, 12c are spaced farther apart from each other than their corresponding end sections 64a, 64b, 64c. Thus, in some configurations, to create the fan-shaped configuration, end sections 64a, 64b, 64c are each placed within the intersection range 68 so that the end sections 64a, 64b, 64c are more closely spaced together than the distal ends 70a, 70b, 70c. The intersection range 68 may be any area which causes the end sections 64a, 64b, 64c to be more closely spaced together than the distal ends 70a, 70b, 70c. In some examples, the intersection range 68 may comprise an area up to about 20% the length of one of the elements 12a, 12b, or 12c. In other examples, the intersection range 68 may be defined by the projected intersection of the longitudinal axis of each of the elements 12a, 12b, 12c, even when the end sections 64a, 64b, 64c do not directly overlap.

In some configurations, end sections 64a, 64b, 64c overlap to create the fan-shaped configuration. Thus, for example, end sections 64a, 64b, 64c may lie in the same horizontal plane while the longitudinal axis of one or more of the elements 12a, 12b, 12c deviates from that horizontal plane. For example, the longitudinal axis of at least two of the frequency steered transducer array elements can be spaced horizontally apart and rotated vertically at least 15 degrees, at least 20 degrees, or by any amount to achieve a desired field-of-view as described below. In the example of FIG. 13, the longitudinal axis of elements 12a, 12b, 12c are rotated by approximately 22.5 degrees. End sections 64a, 64b, 64c comprise up to 30 percent of the length of the elements 12a, 12b, 12c. In some configurations, end sections 64a, 64b, 64c comprise up to about 15 percent of the length of the elements 12a, 12b, 12c.

The fan-shaped configuration of FIG. 13 provides improved laminar flow over conventional stacked x-configurations. The elements 12a, 12b, 12c do not "jut out" ahead of each other so water flow is not disrupted on the face of any element 12a, 12b, 12c. A hydrodynamic endcap may be placed on the leading square ends of the elements 12a, 12b, 12c to further improve flow. Additionally, mechanical and electrical attachment (and other assembly processes) of the transducer assembly and its components are greatly simplified with all elements 12a, 12b, 12c in one plane.

The example configuration of FIG. 13 enables the generation of a field-of-view 62 like that illustrated in FIG. 11, while providing improved hydrodynamic characteristics when compared to conventional stacked x-configurations. Each of the elements 12a, 12b, 12c can be configured to transmit an array of sonar beams in angular directions that form a sonar wedge. Those sonar wedges combine to form field-of-view 62.

Figure 12:
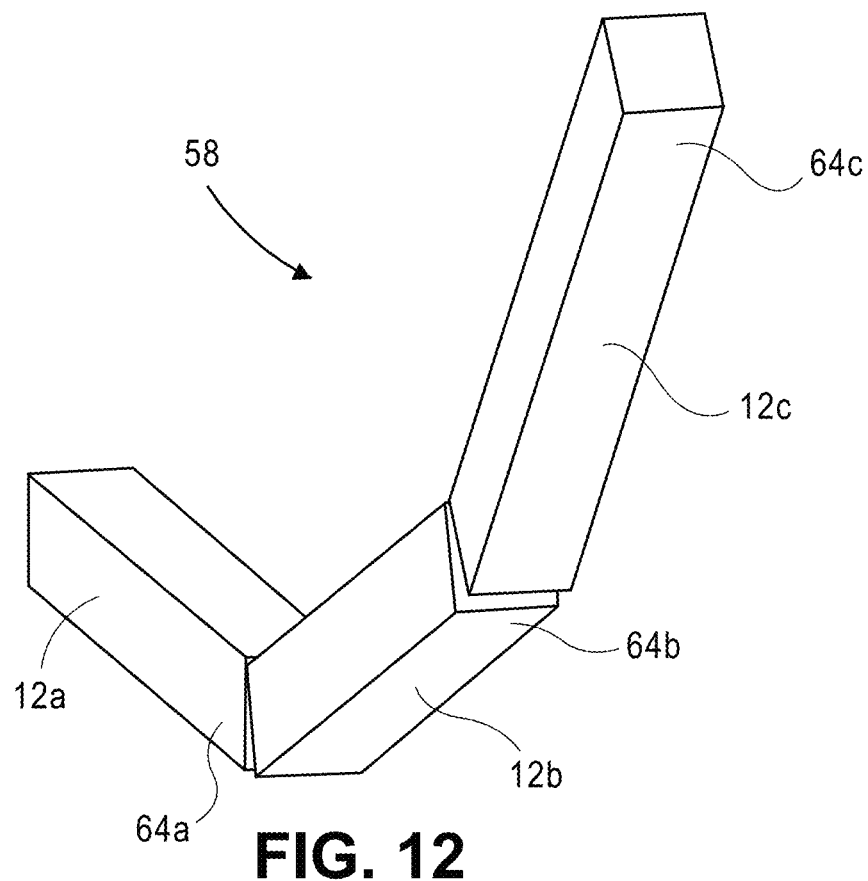
FIG. 12 is a perspective view of an example sonar transducer assembly, wherein the frequency steered transducer elements of the assembly are arranged end-to-end.
Figure 14A:
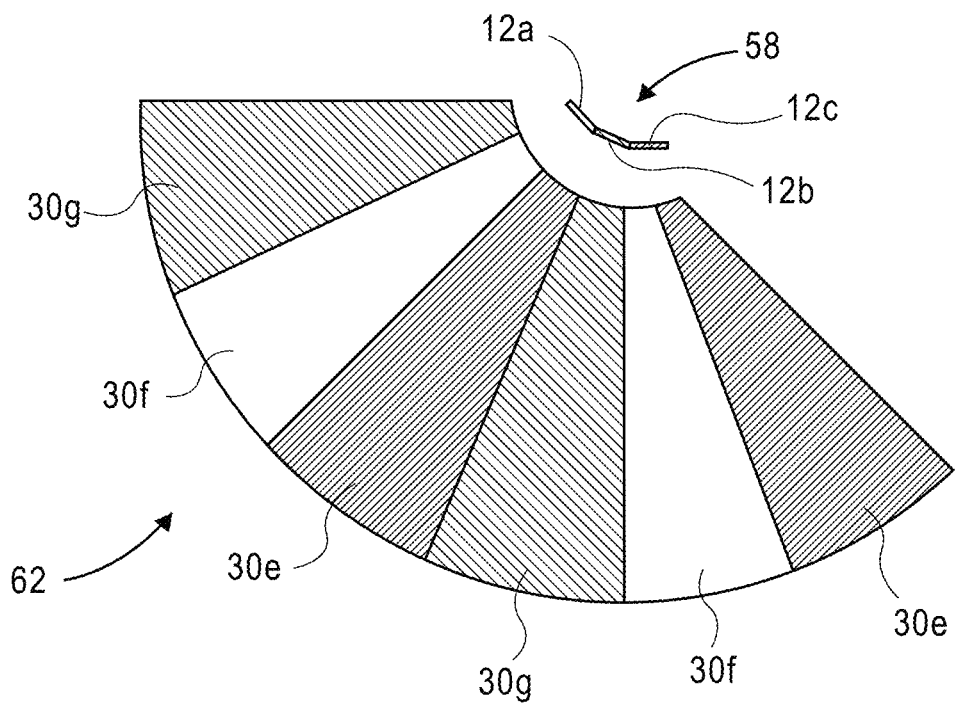
FIG. 14A is a diagram illustrating an exemplary field-of-view for the sonar transducer assembly of FIG. 12.
Figure 14B:
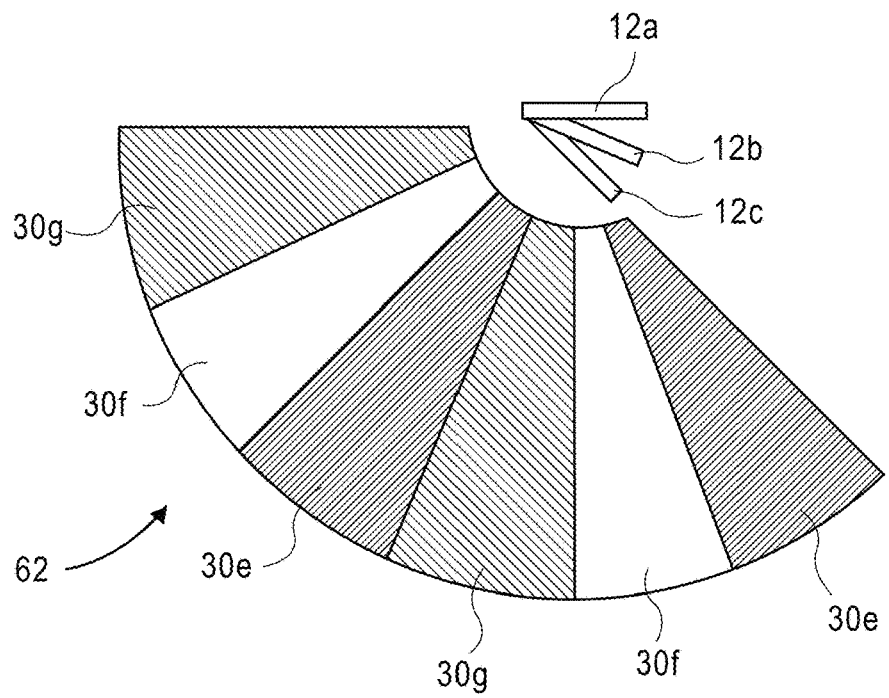
FIG. 14B is a diagram illustrating an exemplary field-of-view for the sonar transducer assembly of FIG. 13.
Figure 15:
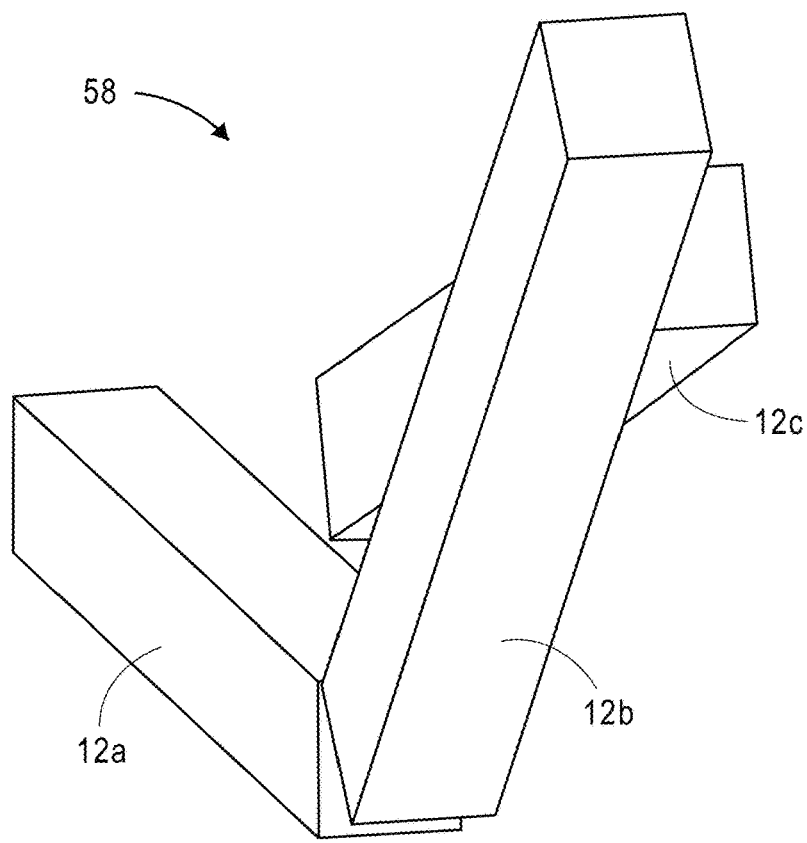
FIG. 15 is a perspective view of another example sonar transducer assembly including a plurality of frequency steered transducer elements.

FIGS. 14A and 14B illustrate example fields-of-view 62 for the assembly configurations of FIGS. 12 and 13. In the illustrated example configurations, a near-continuous field of view 62 is provided by the array assembly 58 without requiring the stacking of arrays. Because the origin of the sonar beams are slightly offset array-to-array, it can be desirable to slightly overlap the wedges and use graphical techniques (such as blending) to deal with the borders between sectors. However, the array elements 12a, 12b, 12c may be positioned in any configuration to increase or decrease the amount of overlap of the wedges to generate any desired field-of-view.

In the example of FIG. 14B, element 12a generates wedges 30e, element 12b generates wedges 30f, and element 12c generates wedges 30g. Wedges 30e, 30f, 30g form field-of-view 62 to generate a desired region of sonar coverage. In configurations, the sonar wedges 30e, 30f, 30g generated by the elements 12a, 12b, 12c generate a field-of-view 62 of at least 60 degrees, a field-of-view of at least 90 degrees, or any amount to achieve a desired coverage region. In the example of FIGS. 14A and 14B, the field-of-view 62 is at least 130 degrees. A field-of-view such as 130 degrees, or even generally exceeding 90 degrees, can be desirable in various boat-mounted configurations to provide forward-looking sonar coverage in addition to coverage underneath the boat.

In the fan-shaped configuration of FIG. 13, the end sections 64a, 64b, 64c overlap while the longitudinal axis of one or more of the elements 12a, 12b, 12c is vertically varied (e.g., 10 degrees, 20 degrees, 22.5 degrees, 30 degrees, etc) to determine the alignment of the various wedges 30e, 30f, 30g. However, any number of elements 12, wedges 3, and vertical alignments may be employed to create any desired field-of-view 62.

In other configurations, fewer than three, or more three, elements 12 may be utilized with a partially-stacked configuration. If the application calls for a balance between drag profile and overall product dimensions, compromised arrangements are possible such as the triangle arrangement illustrated in FIG. 15.

Figure 16:
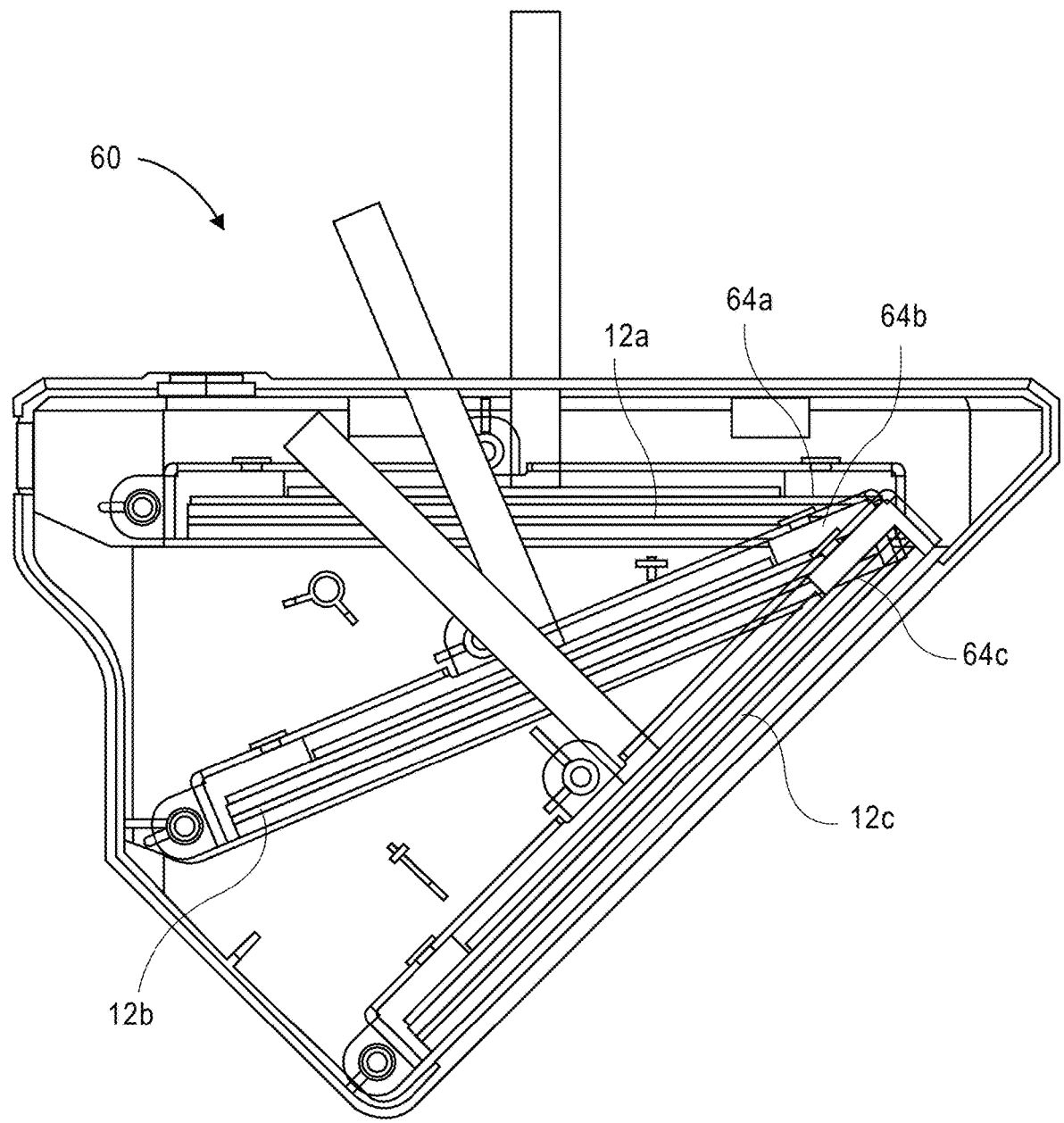
FIG. 16 is a cross section of a housing of the example sonar transducer assembly of FIG. 13.
Figure 17:
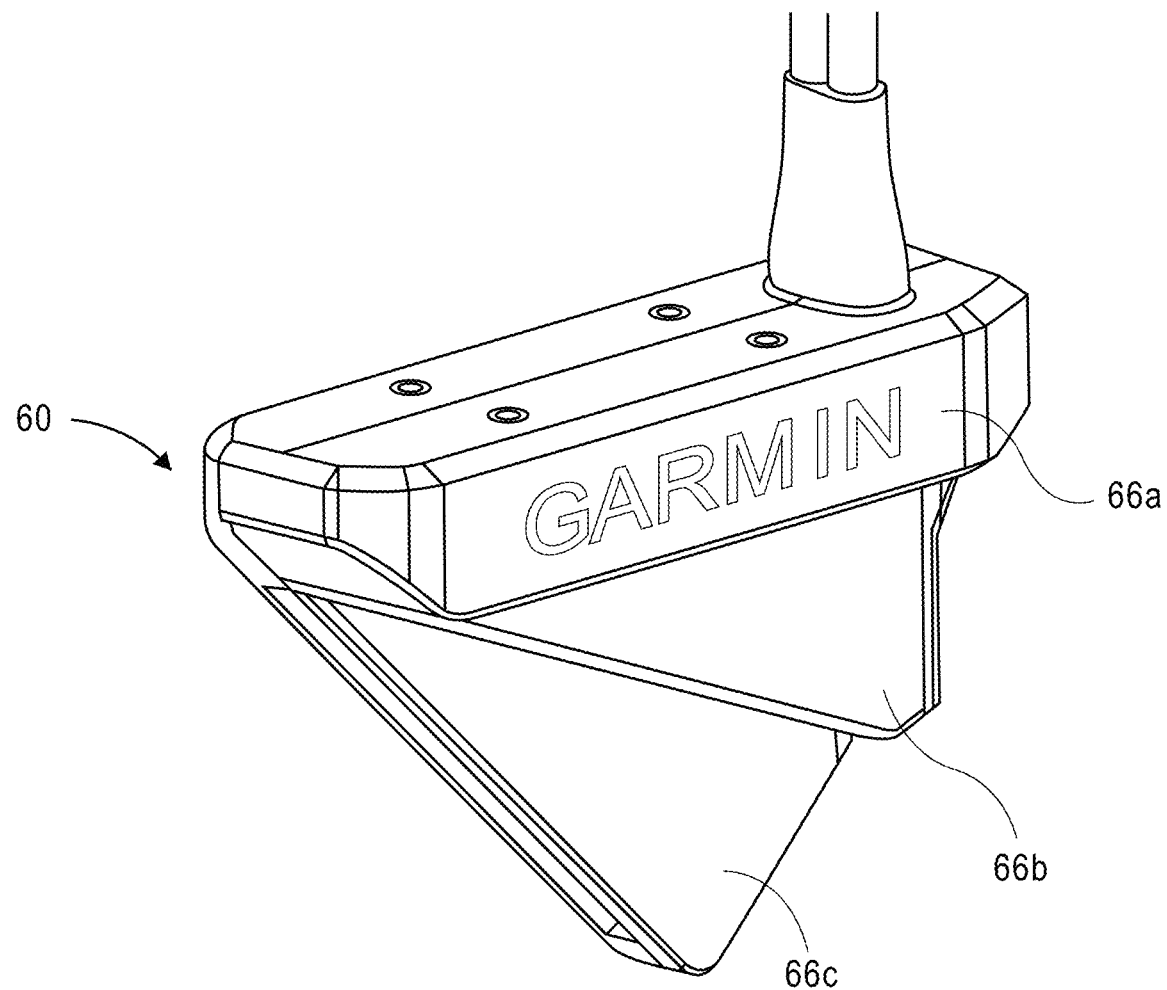
FIG. 17 is a perspective view of the housing of FIG. 16.

Referring to FIG. 16-17, a housing 60 is illustrated including the array elements 12a, 12b, 12c. Elements 12a, 12b, 12c are positioned within housing 60 to enable the housing 60 to present a shape and configuration suitable for mounting on the underside of a boat without impacting boat or sonar performance. That is, the fan arrangement of elements 12a, 12b, 12c within housing 60 allows the housing 60 to stay in the water while elements 12a, 12, 12c continue ensonifying and imaging the scene under the boat, even when the boat is in motion and "on plane".

In configurations, housing 60 is triangular shaped and configured to be affixed to the transom of a boat. Housing 60 may include housing sections 66a (labeled GARMIN™), 66b, 66c. Housing sections 66a, 66b, 66c respectively house elements 12a, 12b, 12c. Housing sections 66a, 66b, and 66c are sized to the dimensions of elements 12a, 12b, 12c to minimize lensing and other undesirable beam distortions that may be created by excessive plastic and housing materials in front of the transmitting face of each element 12a, 12b, 12c. Housing sections 66a, 66b, and 66c additionally enable housing 60 to present a streamlined configuration, where the width of housing 60 is minimized while presenting a laminar configuration. Housing 60 may include various mounting apertures and connecting elements to allow the housing 60 to be affixed to the transom of a boat. In such transom-mounted configurations, housing sections 66a, 66b, and 66c and the resulting low-drag configuration allow assembly 58 to remain in the water while the boat maneuvers—even at speed—without creating undesirable drag or interference. That is, in various configurations, housing 60 and sections 66a, 66b, 66c enables assembly 58 to be utilized at speeds exceeding 10 mph, or even 40 mph. Housing 60 may additionally or alternatively be configured for mounting to a trolling motor, for mounting to a pole, for mounting through a boat's hull, for towfish mounting, for mounting to a remotely-operated vehicle (ROV), combinations thereof, and the like.

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A transducer assembly comprising:
   a triangular-shaped housing including a first housing section, a second housing section, and a third housing section arranged in a fan-shaped configuration; and
   a plurality of frequency steered transducer array elements positioned within the housing, each of the transducer array elements including a plurality of piezoelectric elements, the plurality of frequency steered transducer array elements including a first element positioned with the first housing section, a second element positioned within the second housing section, and a third element positioned with the third housing section, wherein each of the housing sections are sized to the dimensions of the respective frequency steered transducer array elements housed therein,
   wherein each frequency steered transducer array element is configured to receive a transmit electronic signal including a plurality of frequency components and to transmit an array of sonar beams into a body of water, each sonar beam transmitted in an angular direction that varies according to one of the frequency components of the transmit electronic signal,
   wherein the frequency steered transducer array elements are positioned within the housing in a fan-shaped configuration where an end section of at least two of the frequency steered transducer array elements are within an intersection range of each other,
   wherein the longitudinal axis of at least two of the frequency steered transducer array elements are spaced horizontally apart and rotated vertically between approximately 20 and 30 degrees.

2. The transducer assembly of claim 1, wherein each of the frequency steered transducer array elements are configured to transmit an array of sonar beams in angular directions that form a sonar wedge.

3. The transducer assembly of claim 1, wherein the sonar wedges generated by the frequency steered transducer array elements generate a field-of-view of at least 60 degrees.

4. The transducer assembly of claim 3, wherein the field-of-view is at least 90 degrees.

5. The transducer assembly of claim 4, wherein the field-of-view is at least 130 degrees.

6. The transducer assembly of claim 1, wherein the housing is configured to be affixed to a transom of a boat.

7. The transducer assembly of claim 1, wherein the end sections of the frequency steered transducer array elements overlap.

8. A transducer assembly comprising:
a triangular-shaped housing including a first housing section, a second housing section, and a third housing section arranged in a fan-shaped configuration; and
a plurality of frequency steered transducer array elements positioned within the housing, each of the transducer array elements including a plurality of piezoelectric elements, the longitudinal axis of the frequency steered transducer array elements spaced horizontally apart and rotated vertically between approximately 20 and 30 degrees, the plurality of frequency steered transducer array elements including a first element positioned with the first housing section, a second element positioned within the second housing section, and a third element positioned with the third housing section, wherein each of the housing sections are sized to the dimensions of the respective frequency steered transducer array elements housed therein,
wherein each frequency steered transducer array element is configured to receive a transmit electronic signal including a plurality of frequency components and to transmit an array of sonar beams into a body of water, each sonar beam transmitted in an angular direction that varies according to one of the frequency components of the transmit electronic signal, wherein the transmitted sonar beams form a plurality of sonar wedges that generate a field-of-view of at least 60 degrees,
wherein the frequency steered transducer array elements are positioned within the housing in a fan-shaped configuration where an end section of each of the frequency steered transducer array elements overlap.

9. The transducer assembly of claim 8, wherein the field-of-view is at least 90 degrees.

10. The transducer assembly of claim 9, wherein the field-of-view is at least 130 degrees.

11. The transducer assembly of claim 8, wherein the housing is configured to be affixed to a transom of a boat.

* * * * *